(12) United States Patent
Cosley et al.

(10) Patent No.: US 10,989,334 B2
(45) Date of Patent: Apr. 27, 2021

(54) BRACKET FOR POSITIONING AND PROTECTING PIPES IN CONCRETE

(71) Applicant: Reliance Worldwide Corporation, Poway, CA (US)

(72) Inventors: James W. Cosley, Poway, CA (US); Dennis L. Hart, Poway, CA (US); Virgil O'Neil, Poway, CA (US)

(73) Assignee: Reliance Worldwide Corporation, Poway, CA (US)

( * ) Notice: Subject to any disclaimer, the term of this patent is extended or adjusted under 35 U.S.C. 154(b) by 0 days.

(21) Appl. No.: 16/518,787

(22) Filed: Jul. 22, 2019

(65) Prior Publication Data

US 2020/0032927 A1     Jan. 30, 2020

Related U.S. Application Data

(60) Provisional application No. 62/703,376, filed on Jul. 25, 2018.

(51) Int. Cl.
*F16L 3/12* (2006.01)
*F16L 55/115* (2006.01)
(Continued)

(52) U.S. Cl.
CPC .................. *F16L 3/12* (2013.01); *F16L 1/028* (2013.01); *F16L 55/1152* (2013.01); *E04G 15/061* (2013.01)

(58) Field of Classification Search
CPC ......... F16L 3/12; F16L 55/1152; F16L 1/028; E04G 15/061
See application file for complete search history.

(56) References Cited

U.S. PATENT DOCUMENTS

| 619,517 A | * | 2/1899 | Trammel | .............. B05B 15/625 248/81 |
| 1,632,206 A | * | 6/1927 | Tolman, Jr. | ................ F23J 1/00 285/16 |

(Continued)

FOREIGN PATENT DOCUMENTS

| CA | 2306301 A1 * | 10/2000 | ............ F16L 3/1226 |
| EP | 1008813 A1 * | 6/2000 | ........... F24D 3/1058 |

(Continued)

OTHER PUBLICATIONS

International Search Report for Bracket for Positioning and Protecting Pipes in Concrete, International App. No. PCT/US2018/018213, Filed Feb. 14, 2018 to Reliance Worldwide Corporation.

*Primary Examiner* — Basil S Katcheves
*Assistant Examiner* — Omar F Hijaz
(74) *Attorney, Agent, or Firm* — Stetina Brunda Garred and Brucker

(57) ABSTRACT

A bracket holds a rigid or flexible tube during the pouring of a concrete slab. The bracket has a base and a housing connected to the base. The tube curves around a first tube support on the housing before passing through an opening in the bottom of the housing. The tube and any members inside the tube are cut off so they end inside the housing and are then covered by a housing cap. The base is fastened to a form for the concrete slab. The height of the housing relative to the base is adjusted to place the cap at the planned surface of the concrete slab. After the concrete slab is formed the cap is removed and the cut members inside the housing are connected to other members or devices.

27 Claims, 13 Drawing Sheets

(51) Int. Cl.
*F16L 1/028* (2006.01)
*E04G 15/06* (2006.01)

(56) References Cited

U.S. PATENT DOCUMENTS

| | | | |
|---|---|---|---|
| 2,328,315 A | 8/1943 | Warren | |
| 3,643,267 A | 2/1972 | Winter | |
| 4,433,821 A * | 2/1984 | Bolding | F16L 3/1226 248/65 |
| 4,742,993 A * | 5/1988 | Montgomery | B63B 21/04 254/389 |
| 4,796,865 A * | 1/1989 | Marchetti | B65H 57/12 254/134.3 FT |
| 6,095,462 A * | 8/2000 | Morgan | F16L 3/003 248/316.4 |
| 6,249,975 B1 | 6/2001 | Lin | |
| 6,467,734 B1 * | 10/2002 | Brown | E03C 1/021 248/65 |
| 6,881,901 B2 * | 4/2005 | Egan | H02G 15/013 16/2.1 |
| 6,916,014 B1 * | 7/2005 | Thomas | H02G 1/06 254/134.3 R |
| 7,527,225 B1 * | 5/2009 | Schulz | F16L 3/1226 248/56 |
| 7,635,009 B1 * | 12/2009 | Carew | F16L 3/22 138/110 |
| 7,735,512 B1 | 6/2010 | Ismert et al. | |
| 8,657,344 B2 * | 2/2014 | Glazik | E03B 3/04 285/302 |
| 9,103,116 B2 * | 8/2015 | McConnell | E04F 17/08 |
| 2018/0231146 A1 | 8/2018 | O'Neil et al. | |

FOREIGN PATENT DOCUMENTS

| | | | | |
|---|---|---|---|---|
| EP | 1953439 A2 * | 8/2008 | | F16L 3/1226 |
| EP | 2189695 A1 * | 5/2010 | | F16L 3/1226 |
| JP | 3278583 | 5/1998 | | |
| JP | 10122436 A * | 5/1998 | | F16L 31/1226 |
| JP | 11082813 A * | 3/1999 | | F16L 3/1075 |

* cited by examiner

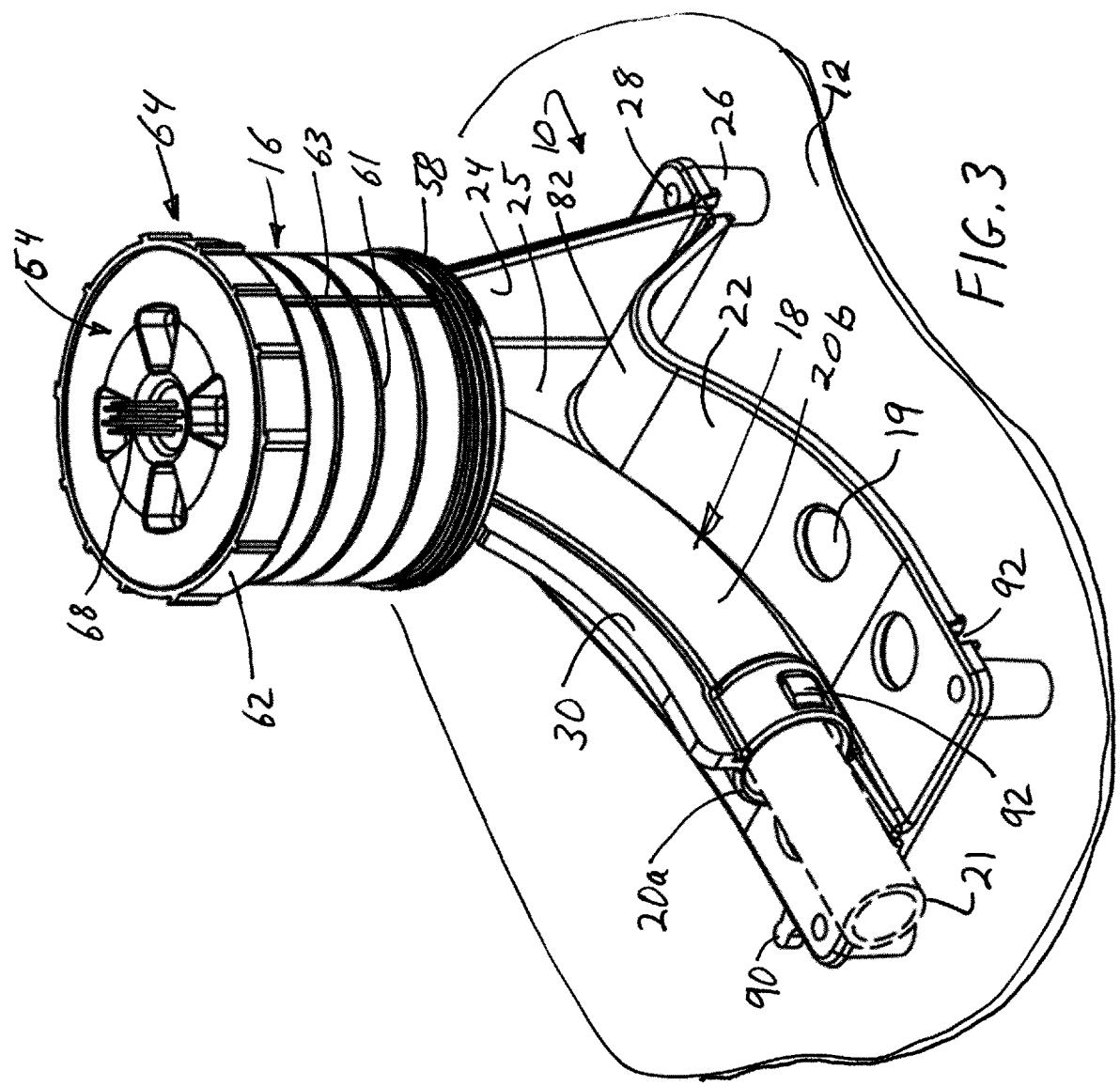

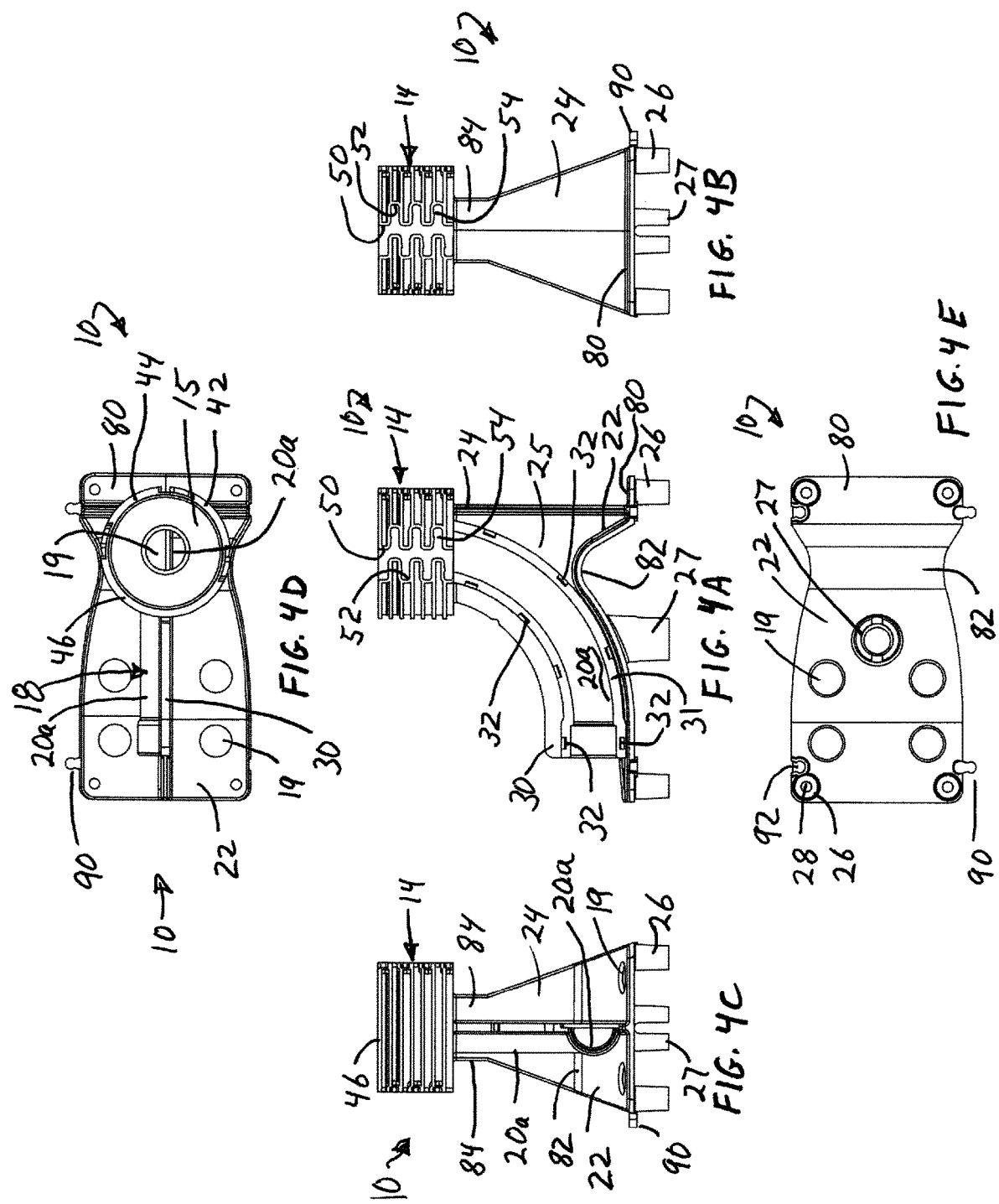

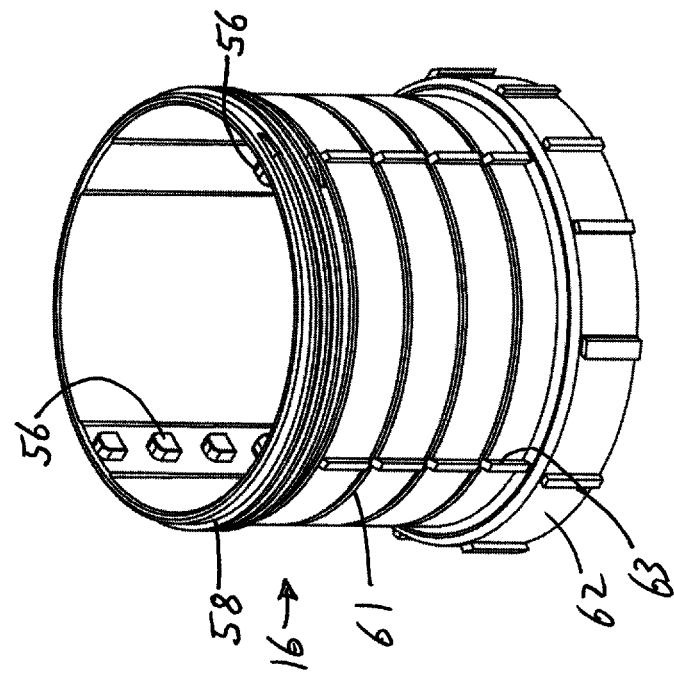
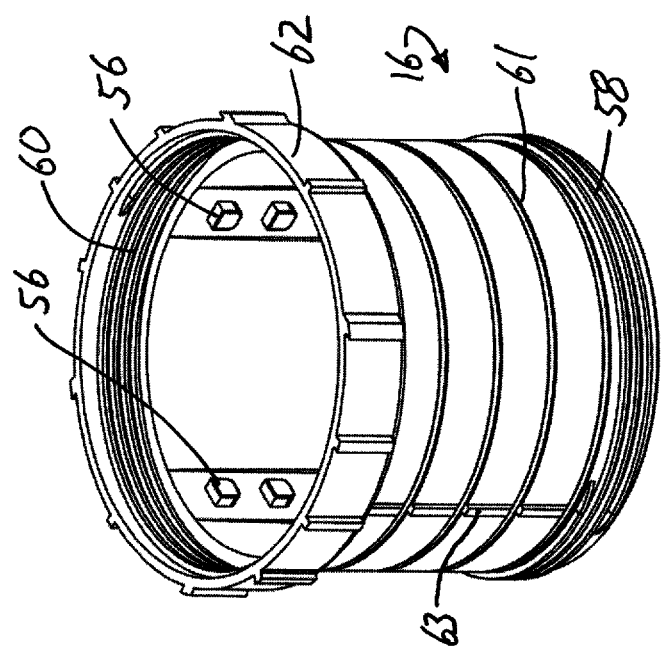

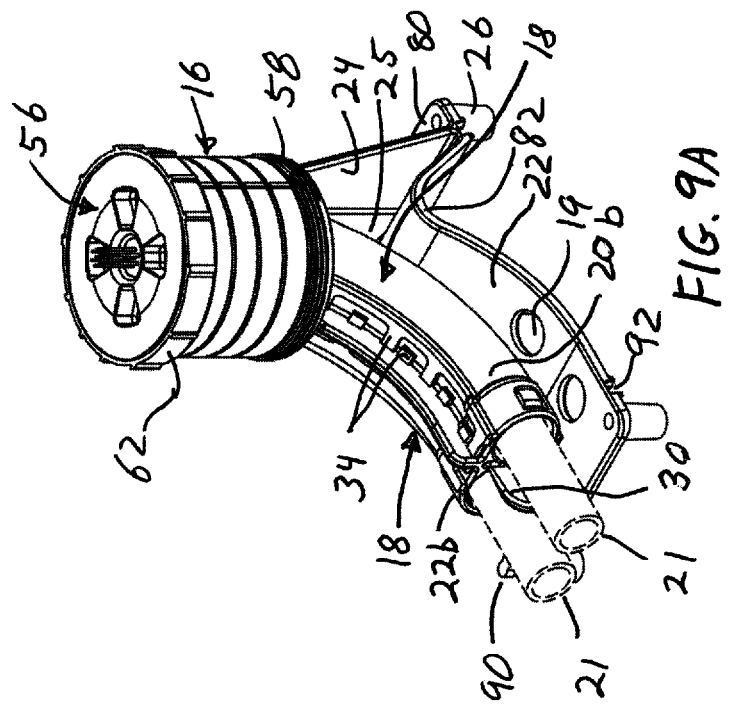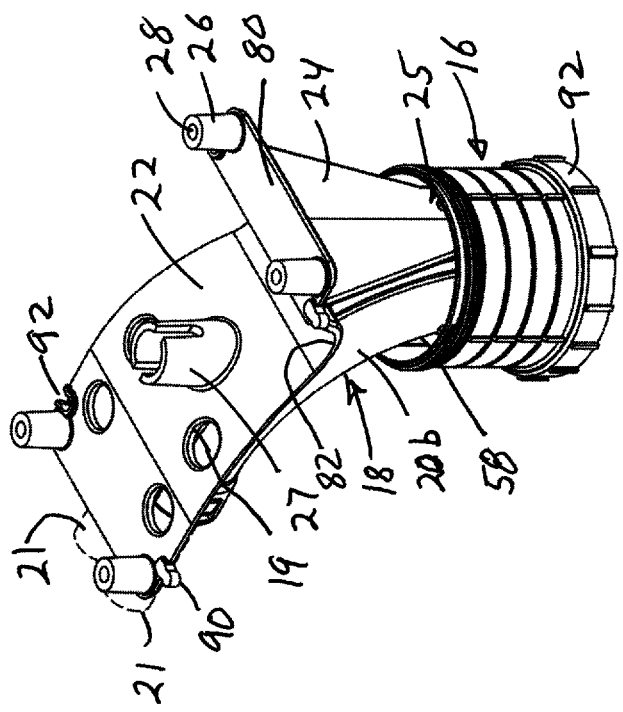

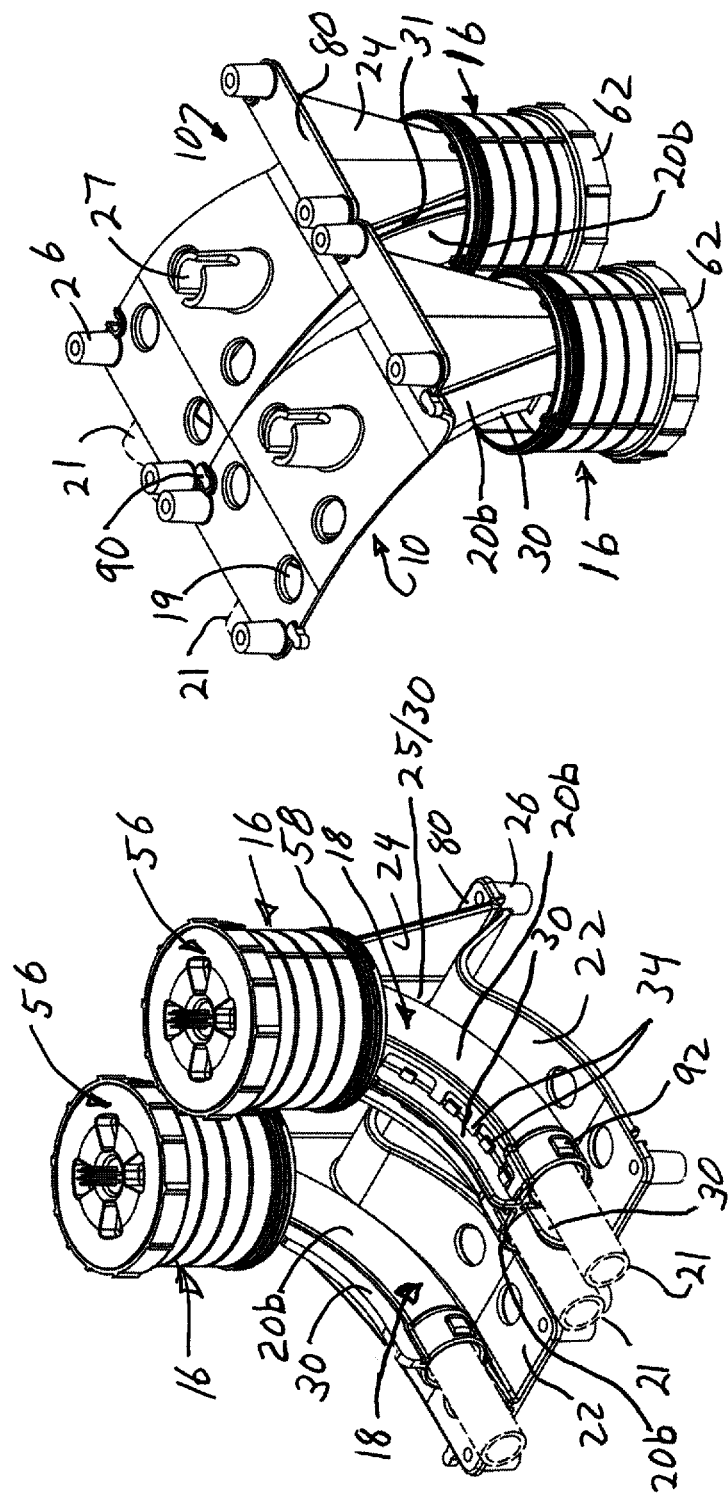

BRACKET FOR POSITIONING AND PROTECTING PIPES IN CONCRETE

CROSS-REFERENCE TO RELATED APPLICATIONS

The application claims the benefit under 35 U.S.C. § 119(e) to Provisional Patent Application No. 62/703,376 filed Jul. 25, 2018, the entire contents of which are incorporated herein by reference.

BACKGROUND

Various tube forms such as pipes, wires or conduits are embedded in concrete floors during construction. The tubes may be either flexible or rigid, and may themselves contain other elongated members such as wires or pipes. The embedded tubes are typically held by brackets that curve or bend the tubes from a generally horizontal orientation to a vertical orientation, or if rigid, sustain them in position, so the end of the tube extends several inches above the surface of the concrete that is poured over the bracket and tube. Unfortunately, after the concrete hardens, the tube or its contents extending out of the concrete surface are often damaged. The damage can arise during finishing of the concrete, especially by troweling machines, or when workers step on the tube, when wheels roll over the tube or when construction equipment or supplies hit or are placed on the tube. The tube is often a conduit containing various tubes, wires or other elongated members (i.e., conduit contents) that are also damaged along with the conduit by the above actions.

The damaged tube or tube contents inhibit connection to other members above the concrete surface for their intended use. For example, a first embedded tube may itself contain a second tube for carrying water which is typically joined to a tubular coupling or connector by mechanically spreading the coupling or connector diameter and inserting an end of the second tube, and where the coupling or connector is subsequently used to form a suitable connection to join it to an adjacent tubular member. Because of damage to the first or second tubes, however, establishing a proper connection with the adjacent tubular member may require removing part of the concrete surface around the first and second tubes to access undamaged portions of the tubes that were formerly embedded within the removed concrete. The cost and disruption of jack-hammering away enough concrete to establish a good connection is undesirable and may crack or otherwise weaken the poured floor—especially if too much concrete is removed either intentionally or accidentally. There is thus a need for a method and apparatus to help avoid or reduce damage to the ends of a tube and its contents that are embedded in a concrete slab and to make it easier and more reliable to connect to the tube or its contents that pass through such concrete slabs.

One prior support for tubes in pipes s described in U.S. patent application Ser. No. 15/895,958 filed Feb. 13, 2018, the complete contents of which are incorporated herein by reference. This application describes a base fastened to a concrete form, with a housing and cap enclosing the end of the tube and any electrical wires extending through into the housing. The housing is connected to a post that mates with the base so the housing and post are separable from the base and can be positioned vertically relative to the base to adjust for the height of the concrete. But the connection using the post may allow movement of the housing and the strength of the connection before being embedded in hardened concrete depends greatly on the strength of the post and its connection to the base. As the supports may be stepped on during construction or pouring of concrete, damage of the support and misalignment of the support and its housing can occur in some environments. There is thus a need for an improved method and device to cure the deficiencies of the prior art, and to support a tube, wire, cable or conduit in a curved configuration during construction, during concrete pouring and thereafter. There is a further need to adjust the position of an enclosure of the tube, wires, cables etc., relative to the top surface of a concrete surface.

Further, some of the prior art supports use curved supports that allow the tubes held by the curved supports to slip out of the connection to the support and become at least partially unsupported. That makes it difficult to securely connect the tubes to the support and to accurately and/or reliably connect the tubes to the support. There is thus a need for a support that allows an easy and fast connection of such tubes to a support, while also securely and reliably connecting the tube to the support.

BRIEF SUMMARY

A bracket is provided that is configured to be fastened to a concrete form, with a curved passage for receiving the tube during use and changing the direction of the tube, preferably through a continuously curved angle of 60° to 90° to avoid sharp bends, and typically from a generally horizontal direction to a generally vertical direction. The curved support preferably has two parts. The first part is advantageously part of the bracket and the second part is separate from and movable relative to the bracket. When the first and second parts are connected they resemble a curved tube. Advantageously the first and second parts snap together, using resilient latches and catches so the second part becomes connected to the bracket. That allows a user to place the bracket and insert the tube easily into the first part of the curved support and then attach the second part of the curved support to the bracket to hold the tube in place in the bracket.

More than one such curved support can be provided on the bracket by having supports for tubes with two curved longitudinal axes parallel to each other but laterally offset and in the same general plane, with the first part of each curved support facing in opposite lateral directions (e.g, one facing left the other facing right) so a second part can be connected to the first part of each curved support. The brackets can be connected together laterally by placing a latch on one bracket and a mating catch on the other bracket, preferably on the base. Thus, single tube brackets can be connected, double tube brackets can be connected, or combinations thereof can be connected.

The bracket has a housing for the ends of any wires or cables or other elongated members extending through the tubes. The housing is advantageously formed as part of the bracket and advantageously comprises a cylindrical, tubular inner housing. The inner housing may have a generally closed bottom with an opening coinciding with the location of each curved support to allow the tube(s) to enter the housing. A cap can close the top end of the inner housing, with the cap and the top end of the inner housing being adjacent and advantageously slightly below the top surface of the finished concrete slab during use if the slab thickness corresponds close enough the height of the inner housing when the bracket is fastened to the concrete form.

An outer housing fits over the inner housing with projections on one of the housings mating with recesses on the other housing to allow the outer housing to be positioned relative to the inner housing and thus adjust the height of the top end of the outer housing. The cap can be connected to the top end of the outer housing. That allows the height of the housing relative to the top surface of the concrete to be adjusted.

Advantageously, a plurality of ridges extends outward from the wall of the inner housing, with one or more axial channels separating the ridges. A plurality of mating projections, such as in the form of locking lugs, extends inward from the wall of the outer housing with the projections located to move axially along the slot or slots separating the ridges, with rotation of the outer housing moving some of the projections between two adjacent ridges to interlock the inner and outer housings. The engagement of a plurality of projections engaging a plurality of ridges provides a strong connection.

Advantageously, the inner housing is part of the bracket, with the bracket extending between the inner housing and the bottom of the bracket that connects to the form, to provide a strong and direct load bearing path between the inner housing and the concrete form during use. Advantageously, the inner housing is connected to the upper end of the curved supports which extend to the bottom of the bracket to provide further support to the inner housing.

In more a bracket is provided for holding at least one tube having a cross-sectional diameter D while being embedded in a concrete slab having a planned thickness T. The bracket may have a base that in turn has a toe end and a heel end with a plurality of feet extending downward from the base and ending in the same horizontal plane. The bracket has an inner cylindrical housing extending along a longitudinal housing axis with that inner housing located above and connected to the heel end of the base by a housing support. The inner housing has an open top and a generally closed bottom with at least one opening in the bottom to receive the at least one tube during use. The inner housing also may have at least a first and second plurality of equally spaced, circumferential recesses on an outer surface of the inner housing, with each plurality of circumferential recesses being in communication with a different axial channel on the outer surface of the inner housing and each axial channel being parallel to the housing axis.

The bracket advantageously has a first curved support having a first curved central axis with the first curved support part extending along that first curved central axis and having a first end connected to the toe end of the base and a second end connected to the inner housing at the bottom of the inner housing. The first curved support part has a cross-section in a plane orthogonal to the first central axis larger than D to receive the at least one tube during use. The bracket also advantageously has a removable cap capable of covering the top of the inner housing.

This basic bracket may have further advantageous variations that may include a tubular, outer housing having open ends and extending along the housing axis during use. The outer housing has a larger diameter than the inner housing to fit over the inner housing during use. The outer housing advantageously has a plurality of locking lugs extending inward with the locking lugs located in columns so the locking lugs can move axially along the channels separating the circumferential recesses. The locking lugs are advantageously spaced axially to align with the circumferential recesses and are further sized to fit into the circumferential recesses when the outer housing is rotated relative to the inner housing to interlock the locking lugs with the circumferential recesses and adjust the relative positions of the inner and outer housings along the longitudinal housing axis. Advantageously, the cap is configured to releasably connect to a top end of the outer housing.

In further variations, basic bracket may have the first curved support include a second curved support part extending along the first central axis. The second curved support part may have a cross-section in a plane orthogonal to the first central axis and connected to the first curved support part to form a tubular passage through the first curved support with a cross-section larger than D to receive the at least one tube during use. In still further variations, one of the first and second curved support parts has latches and the other of the first and second curved support parts has catches to connect the first and second curved support parts together.

The first curved support part may also include a top stiffening flange extending upward along a top side of the first curved support part and extending from a toe end of the first curved support part to the housing and connecting to the bottom of the housing. The top stiffening flange may have one of a first plurality of catches or a first plurality of latches and the second curved support part may have the other of the first plurality of catches or the first plurality of latches to interlock the top stiffening flange and the second curved support part.

The first curved support part may also include a bottom stiffening flange extending downward along a bottom side of the first curved support part and extends from the toe end of the first curved support part to the housing support. The bottom stiffening flange may have one of a second plurality of catches or a second plurality of latches and the second curved support part may have the other of the second plurality of catches or the second plurality of latches located to interlock the stiffening flange and the second curved support part.

In still further variations, the base may have a generally rectangular shape when viewed from a bottom of the bracket, with a foot at each corner of the base. Advantageously, the base has an opening on each opposing side of the first curved support part and at the toe end of the base to allow entrainment by concrete during use. A bottom portion of housing support may include a triangular shaped plate so that a bottom portion of the outer housing can extend over a top portion of the triangular shaped plate and thus lower the height of the outer housing relative to the bracket and inner housing. The bracket may also include a central support extending from a middle of the base downward and ending in the same plane as the feet.

The bracket may also include both first and second curved supports. In this configuration, the bracket advantageously includes a stiffening flange extending upward from the base and extending from the toe end to the heel end of the base and connecting to the bottom of the housing and the housing support. The first curved support is advantageously located on a first laterally facing side of the stiffening flange and the second curved support is advantageously located on a second laterally facing side of the stiffening flange. The second curved support is constructed like the first curved support and has a second central axis and a third and fourth curved support parts extending along that second central axis, with the third curved support part having a first end connected to the base at the toe end of the base and has a second end connected to the bottom of the inner housing and in communication with an inside of the inner housing. The third and fourth curved support parts cooperate to form a tubular passage through the second curved support having a cross-section larger than D in a plane orthogonal to the second central axis.

In further variations, either or both of the third and fourth curved support parts may have a semi-circular cross-section with a diameter larger than D. Further, the second or fourth support parts may have one of a latch or catch to releasably connect to the other of a catch or a latch on a connector of a protective tube enclosing the tube having a diameter D during use of the bracket.

The bracket may have more than one outer housing connected in a vertical arrangement to extend the height of the stacked outer housings. The bracket may thus include first and second tubular, outer housings each having open ends and extending along the housing axis and each having a larger diameter than the inner housing. Each first and second outer housing may have a plurality of locking lugs extending inward with the locking lugs located in columns to move axially along the channels separating the circumferential recesses. The locking lugs are advantageously spaced axially to align with the circumferential recesses and sized to fit into the circumferential recesses when either the first or second outer housing is rotated relative to the inner housing to interlock the locking lugs with the circumferential recesses and adjust the relative positions of the inner and outer housings along the longitudinal housing axis.

Advantageously, each first and second outer housing also has first and second rotational interlocking devices on respective top and bottom ends of each housing and configured so the second rotational interlocking device of the second outer housing may interlock with the first rotational interlocking device of the first outer housing to interconnect the first and second housings along the longitudinal axis, with the cap releasably engaging the first rotational interlocking device of the second outer housing, and the locking lugs of the first outer housing engaging the circumferential recesses on the outer surface of the inner housing.

The inner and outer housings advantageously have three axial channels, two of which are spaced 90°, with the locking lugs located to fit in those channels, and wherein the inner housing has first and second and third pluralities of circumferential recesses each in communication with two of the three axial channels. The base may also include a rear flange located on an opposing side of the housing support as the first curved support. Advantageously, the rear flange has two feet, each on an opposing side of the rear flange. Advantageously, the cross-section of the passage formed by the first and second curved parts is circular and has a diameter greater than D. This ends the initial variations on the basic bracket, but each of these above described, initial variations on the basic bracket may be used in any combination with the other variations, as may the variations described in more detail in this application.

There is also provided a kit that may form a bracket for holding at least one tube having a cross-sectional diameter D while being embedded in a concrete slab. The kit may include a base having a toe end and a heel end with a plurality of feet extending downward from the base and ending in the same horizontal plane. Each foot may have a passage therethrough for a fastener. The bracket has an inner cylindrical housing extending along a longitudinal housing axis with the inner housing located above and connected to the heel end of the base by a housing support. The inner housing has an open top and a generally closed bottom with at least one opening in the bottom to receive the at least one tube during use. The inner housing also has at least a first and second plurality of equally spaced, circumferential recesses on an outer surface of the inner housing, with each plurality of circumferential recesses being in communication with a different axial channel on the outer surface of the inner housing and each axial channel being parallel to the housing axis.

The bracket also includes a first curved support having a first central axis and a first curved support part, with the kit including a second curved support part, each curved support part extending along the first curved central axis. The first curved support party has a first end connected to the toe end of the base and a second end connected to the inner housing at the bottom of the inner housing. The first and second curved support parts form a tubular passage through the first curved support where the passage has a cross-section in a plane orthogonal to the first central axis larger than D. Advantageously, that cross-section is circular and the passage is a curved, cylindrical passage.

The kit also advantageously and preferably includes a first, tubular, outer housing having opposing and open, top and bottom ends, with the first outer housing having a larger diameter than the inner housing so it fits over the inner housing along the longitudinal axis. The first outer housing has a plurality of locking lugs extending inward and located in columns to move axially along the channels separating the circumferential recesses when the first outer housing moves along the housing axis and over the inner housing. The locking lugs are spaced axially to align with the circumferential recesses and are sized to fit into the circumferential recesses when the first outer housing and the inner housing are rotated relative to each other to interlock the locking lugs with the circumferential recesses. The kit also has a removable cap for the top end of the outer housing.

In further variations, the kit may include all of the variations on the basic bracket described above and described in more detail herein. The kit may further include a second, tubular outer housing having open, top and bottom ends, the second outer housing having a larger diameter than the inner housing and fitting over the inner housing along the longitudinal axis, the second outer housing having a plurality of locking lugs extending inward and located in columns to move axially along the channels separating the circumferential recesses, the locking lugs spaced axially to align with the circumferential recesses and sized to fit into the circumferential recesses, the second outer housing having third and fourth rotational interlocking devices on the respective top and bottom ends of the second outer housing, and configured to interlock with a different one of the first and second interlocking devices of the first outer housing to interconnect the first and second outer housings along the longitudinal axis during use.

The kit may also include a first outer housing that first and second rotational interlocking devices on respective top and bottom ends of the first outer housing with the first rotational interlocking device configured to releasably connect to the cap. The kit may also include a stiffening flange extending from the toe end to the heel end of the base and connected to the housing support and the bottom of the housing. The stiffening flange may have a first plurality of openings above the first curved support part and a second plurality of openings below the first curved support part, where the first and second plurality of openings form catches for latches extending from the second curved support part. Advantageously, the first curved support part forms a portion of the stiffening flange.

The kit may also include two curved supports on one bracket. Advantageously, the bracket includes a stiffening flange with opposing first and second laterally facing sides with the first curved support part located on the first laterally facing side and a second curved support located on the second laterally facing side of the stiffening flange. The second curved support is like the first curved support but facing a different way. The second curved support has a second central axis, the second curved support having third and fourth curved support parts each extending along the second central axis. The third curved support part has a first end connected to the base at the toe end of the base and has a second end connected to the bottom of the inner housing and in communication with an inside of the inner housing. The third and fourth curved support parts form a tubular passage through the second curved support where the passage has a cross-section in a plane orthogonal to the first central axis larger than D and where that passage preferably has a circular diameter and comprises a curved, cylindrical passage.

There is also provided a method of supporting a tube during the forming of a concrete slab poured on a concrete form, using a bracket having a base and a housing with a cap enclosing a top opening of the housing to allow access to the tube when the tube is inside the housing. The tube extends along a curved axis between the concrete form and the planned surface. The method includes securing the tube to the bracket where the bracket has a curved, tubular support extending along the curved axis. The curved tubular support is separated along a vertical plane containing or parallel to the curved axis to form first and second curved support parts. The first curved support part is permanently affixed to the bracket. The securing step includes placing the tube into the first curved support part and passing an end of the support tube through an opening in the bottom of the housing. The housing includes an inner housing that is permanently affixed to the first curved support part. The securing step further including connecting the second curved support part to the bracket to form the first support tube and enclose the tube along the curved axis. The method also includes fastening the bracket to the concrete form.

In further variations, the method includes the step of passing a tubular outer housing having open ends and a larger diameter than the inner housing along the housing axis until an axial column of axially spaced locking lugs that extend inward from the outer housing align with one or more axially spaced, circumferentially extending recesses that each encircle a portion of an outer circumference of surface of the inner housing; to adjust the relative height of the inner and outer housings along the housing axis. This variation also includes the step of rotating one or both of the inner and outer housings and moving at least some of the locking lugs into the circumferential recesses. The rotating step may occur before the fastening step. The step may occur after the fastening step. The method may also include the step of connecting the second curved support part to the bracket by engaging a plurality of latches on opposing top and bottom sides of the second curved support part with catches on opposing top and bottom sides of the first curved support part.

BRIEF DESCRIPTION OF THE DRAWINGS

The above, and other features and advantages of the present invention are further described in the following drawings and description in which like numbers refer to like parts throughout, and in which:

FIG. 3 is a top perspective view of an assembled bracket assembly of FIG. 1 with a tube shown in phantom lines;

FIG. 4A is a side view of the bracket of FIG. 2 with catch openings for a curved support part, with the opposing view being the mirror image thereof;

FIG. 4B is a right side view of the bracket of FIG. 4A;

FIG. 4C is a left side view of the bracket of FIG. 4A;

FIG. 4D is a top view of the bracket of FIG. 4A;

FIG. 4E is a bottom view of the bracket of FIG. 4A;

FIG. 6A is a top perspective view of the outer housing of FIG. 1;

FIG. 6B is a bottom perspective view of the outer housing of FIG. 6A;

FIG. 9A is a top perspective view of the assembled bracket assembly of FIG. 8 with the tubes shown in phantom;

FIG. 9B is a bottom perspective view of the assembly of FIG. 9A;

FIG. 12A is a top perspective view of two bracket assemblies and three tubes, connected side-by-side;

FIG. 12B is a bottom perspective view of the bracket assemblies of FIG. 12A.

DETAILED DESCRIPTION

Figure 1:
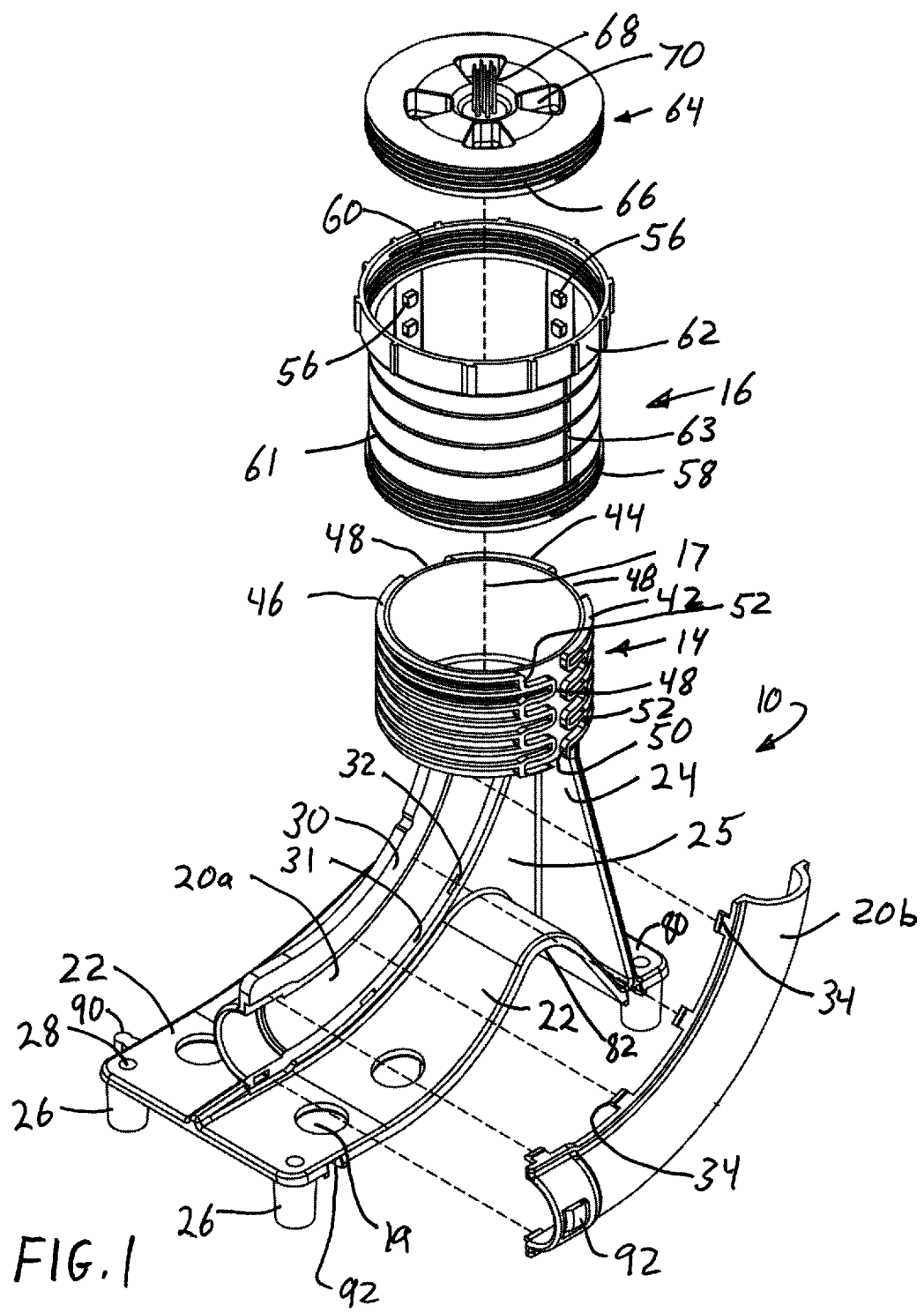
FIG. 1 is an exploded perspective view of a bracket assembly for a single curved tube but without the tube.

A list of part numbers and corresponding part names used herein is provided as follows:

As used herein, the relative directions up and down, above and below, top and bottom, upper and lower, refer to the vertical direction when the bracket 10 is fastened to a generally horizontal concrete form 12, which is the orientation shown in at least FIGS. 1, 8 and 12. The actual orientation of the concrete form may vary in which case the lateral direction will change accordingly. The lateral direction is to the side, preferably but not necessarily in a horizontal plane generally parallel to the concrete form 12. Advantageously a side profile of the bracket may resemble a high-heeled shoe, with the end of the bracket closest to the concrete form 12 during use comprising the toe-end, with the heel end opposite thereto. The relative directions left and right, are with respect to a view from the looking from the toe end to the heel end of the bracket 10.

Referring to FIGS. 1-7, the bracket 10 has a toe end adjacent the concrete form 12 during use, with a heel end opposite the toe end. An inner housing 14 and an optional outer housing 16 are at the heel end of the bracket, each housing extending along longitudinal housing axis 17 during use. The inner housing 14 advantageously takes the form of a tube with a generally closed bottom 15 while the outer housing 16 is tubular with open ends. The housings 14, 16 are preferably cylindrical. At least a first curved support 18 extending from the inner housing to the toe end of the bracket 10. The curved support 18 has first and second curved support parts 20a, 20b, respectively, which together form a curved tube having a cross-section larger than the diameter D of the tube 21 so the larger cross-section can enclose the tube 21. The curved support 18 preferably has a generally circular cross-section and extends along a curved longitudinal axis along the center of the curved support 21. That curved longitudinal axis curves about an axis parallel to the concrete form 12 and to the concrete surface which is typically parallel to the concrete form and curves from a toe-end adjacent the concrete form to a generally vertical orientation when the form 12 is horizontal. The upper end of the curved support part 20a is advantageously connected to and advantageously forms a unitary portion of an injection molded bottom 15 of the inner housing 14.

During use, a tubular conduit such as tube 21 (FIG. 3) having an outer diameter D passes through the curved support 18 and its the curved support parts 20a, 20b and preferably into at least one of the housing(s) 14, 16. and is held in position by the bracket 10. The cross-sectional diameter of the curved passage formed by the curved support parts 20a, 20b has a diameter larger than D in a plane orthogonal to the curved central axis or longitudinal axis of the support tube. Thus, each the diameter of the cross-section for the semi-circular cross-section of each curved support part 20a, 20b is larger than D.

An opening 19 (FIG. 4D) in the bottom 15 of the inner housing 16 allows the tube 21 to enter the inner housing, or allows the wires, cables, or other elongated members in the tube 21 to enter the inner housing 16. The tube 21 may comprise a flexible conduit, wire, cable or other elongated member to be embedded in and pass through the concrete in which the bracket 10 is embedded. Advantageously, a base 22 extends from the toe end to the heel end of the bracket 10, preferably continuously in the form of a thin plate following the curvature of the curved support 18 for at least a portion of the length of that curved support.

A housing support 24 extends between the base 22 and the inner housing 16 at the heel end of the bracket. A heel support flange 25 extends between the housing support 24 and the curved support 18 and the base 22, preferably connecting to and forming a unitary portion of an injection molded curved support part 20a and base 22. The heel support flange extends laterally between the inner housing 14 and the base 22 to provide lateral support to the housing as well as to resist downward force if a worker steps on the inner housing during construction. The heel support flange 25 provides vertical support, helps transmit forces in the plane of the flange 25 and stiffens the bracket 10. The heel support flange 25 preferably connects to the support part 20a along the curved length of the bottom of the curved support part 20a, until that curved support part becomes connected to the base 22.

A plurality of feet 26 and a central support 27 extend between the base 22 and the concrete form 12 during use. The depicted base 22 has a generally rectangular shape when viewed from the top or bottom, with a foot 26 at each of the four corners and a central support 27. Each foot 26 is advantageously a short tube, preferably cylindrical, with a central passage 28 therethrough to accommodate passage of a fastener to connect the foot (and thus the bracket 10) to the concrete form 12 during use. Threaded fasteners are preferred, although nails and other fasteners are suitable. As such fasteners are well known in the art, they are not shown. The central support 27 is located at about the middle of the length and width of the base 22 when viewed from the top or bottom. The central support 27 is also preferably tubular but has a slot (FIG. 2B) extending through opposing sides of the tube to allow concrete to enter the tube during use. The feet 26 and central support 27 have a lower end contacting the concrete form 12 during use, with their upper end connected to and preferably forming a unitary portion of an injection molded base 22. The feet 26 and central support 27 transfer downward forces on the bracket 10 to the concrete form 12 on which the feet and central support rest during use, so that if a worker steps downward on the bracket 10, the bracket doesn't break.

A stiffening flange 30 advantageously extends from the toe end toward the heel end of the base 22, with the first curved support part 20a connected to the stiffening flange and optionally forming part of the stiffening flange. When the stiffening flange forms part of the first curved support part 20a, the stiffening flange may have a top stiffening flange 30 and a bottom stiffening flange 31. For brackets having a single curved support 18, the stiffening flange 30 thus advantageously comprises a bottom support flange 31 between the bottom of the curved support 18 and the base 22, and a top support flange 30 extending upward from the top of the curved support part 20a, with the curved support 20a connecting the bottom and top stiffening flanges 30, 31.

Advantageously, the stiffening flange 30 and 31 have a plurality of catches 32 such as openings or recesses which engage a plurality of resilient latches 34, but may have a plurality of longitudinally extending laches. When a single curved support 18 is used, the bottom stiffening flange 31 advantageously extends a short distance from the base 22 to the bottom of the curved support part 20a and the top stiffening flange 30 extends from the top side of the curved support part 20a in a generally vertical plane during use. The bottom stiffening flange 31 extends from the base 22 a distance sufficient to form latches or catches as mentioned above and as further described later.

The stiffening flange 30 on the top of the support part 20a strengthens the bracket against bending and breakage if a worker steps downward on the bracket 10 during use, while the stiffening flange 31 on the bottom of the support 20a provides openings forming catches or optionally provides laches, as described later. The stiffening flange 31 on the bottom of the curved support 18 continues from the toe end toward the heel end of the bracket, and extends between the bottom of the curved support 18 and curved support part 20a, to the top of the base 22. For brackets having a single curved support 18, the stiffening flange 30 thus advantageously comprises a bottom support flange 31 between the bottom of the curved support 18 and the base 22, and a top support flange 30 extending upward from the top of the curved support part 20a, with the curved support 20a connecting the bottom and top stiffening flanges 30, 31.

The inner housing 14 has a plurality of external ridges extending radially outward from housing axis 17 and spaced a uniform distance apart and extending around a circumference of the inner housing. The ridges do not extend continuously around the circumference of the inner housing, but are separated by a plurality of channels that are preferably vertically aligned so the slots are parallel to the longitudinal axis of the inner housing. Advantageously, the channels 48 are formed so each ridge extends only part way around the outer circumference of the inner housing 14. From two to 10 channels are believed suitable, with 3 to 5 channels preferred. The drawings show three channels 48 spaced unequally around the circumference of the inner housing 12 so the sets of ridges are not all of the substantially the same circumferential length and in the depicted embodiment two sets of ridges are of equal length and the third set of ridges is longer.

The ridges separated by channels form first, second and third sets of outwardly extending ridges 42, 44 and 46, respectively with intervening channels 48 between the respective ridges of each set of ridges. The ridges within each set of ridges have the same part number as does the set of ridges, so that a plurality of ridges 42 form the first set of ridges 42. The channels 48 are advantageously parallel to longitudinal or axial housing axis 17 and may be referred to herein as axial channels 48. The first set of ridges 42 extend between two intervening channels 48 and extend for about a quarter of the way around a first partial circumference of the inner housing 14. The second set of ridges 44 and the channels 48 between those second ridges extend about a quarter way around the adjacent side or partial circumference of the inner housing 14. The third set of ridges 46 and the channels 48 between those third ridges extend about half way around the adjacent side or partial circumference of the inner housing 14. The circumferential length of the sets of ridges 42, 44 and 46 are thus, advantageously not all the same length.

The ridges 42, 44 and 46 are equally spaced apart along the axial direction or longitudinal axis 17 of the inner housing 16. The ridges 42, 44, 46 may be viewed as forming circumferential recesses in the outer surface of the inner housing 16, between each pair of ridges, with the circumferential recesses being in communication with the channels 48.

Advantageously, but optionally, the leading end of two adjacent ridges 42 or two adjacent ridges 44 or two adjacent ridges 46 within each set of ridges may be joined by an axially extending end segment 50 (FIG. 1, 4A, 4B), but the end segment 50 joins only two adjacent ridges and does not form a continuous axial line. As used herein, the leading end of a ridge is the most clockwise end viewed along axis 17 when looking from the inner housing 16 toward the base 20. The trailing end of a ridge is the most counterclockwise end when viewed along axis 17 when looking from the inner housing 16 toward the base 20. Each adjacent pair of ridges joined by axially extending end segments 50 may be joined by offset end segment 52 which also extends axially. Thus, the offset end segment 52 is advantageously staggered axially to join every other ridge 44, 46 or 48. The offset end segments 52 are also axially offset between the sets of ridges 44, 46 and 48 so that each axial end segment 50 is circumferentially adjacent to an offset end segment 52 (FIG. 1, 4A, 4B). The circumferential space between axial end segments 50 may form the axial channel 48 when the end segments 50 are used. The circumferential recess formed by the offset end segments 52 and the two adjacent axial end segments 50 above and below each end segment 52, forms a locking recess for use with a locking lug as described later.

A latching member 54 (FIG. 2B) optionally extends slightly axially and parallel to the longitudinal axis from a location at or near the axially extending end segments 50 to form a snap lock connection with a locking lug 56 engaged by the latching member 54. The latching member 54 is located about the circumferential width of the locking lug 56 from the offset end segment 52, to hold the locking lug against the offset end segment during use, as will become apparent.

Referring to FIGS. 1, 6A, 6B and 7B, a plurality of locking protrusions or locking lugs extend inward from the opposing inner sides of the outer housing 16 to engage the circumferential recesses formed by the sets of ridges 42, 43, 44 and offset end segments 52 to interlock the inner and outer housings 14, 16. The protrusions may be hollow or solid and may have various shapes. As used herein, the locking protrusions are referred to as locking lugs 56.

The locking lugs 56 are aligned in axial columns corresponding in number to the number of longitudinal or axial channels 48. Each locking lug 56 is sized in its circumferential direction to fit within one of the channels 48 so the outer housing 16 can slide over and axially along the outside of the inner housing 14 with the locking lugs moving along the axial channels so the inner and outer housings can vary their combined axial length.

The sets of ridges 42, 44, 46 form sets of recesses in the outer surface of the inner housing that are in communication with the channels 48. The locking lugs 56 are axially spaced a distance to coincide with the axial spacing between the ridges to coincide and to coincide with the circumferential recesses between those ridges. The locking lugs 56 may be rotated axially into the circumferential recesses so the recesses restrain axil motion of the locking lugs and outer housing 16 relative to the inner housing 14.

The locking lugs 56 are sized to fit into the gaps formed by the staggered axial end segments 50, 52 so that rotating the outer housing 16 places the locking lugs 56 between two adjacent ridges 42, 44 or 46 on the inner housing 14. The latching member 54 advantageously engages a mating recess on the upper edge of the adjoining locking lug 56, to snap-lock the outer housing 16 to the inner housing 14. The ends of the ridges 42, 44, 46 and the axial end segments 50, 52 restrain rotation of the lugs 56 and also provide an axial strength if a worker strikes or steps on the outer housing 16. Thus, the lugs 56 hit end segments 50, 52 to stop axial movement of the tube 60 until the lugs are rotated into the channels 48a, 48b.

The axial end segments and offset end segments 50, 52 may be omitted so the locking lugs 56 may be rotated to fit between two adjacent ridges 42 or 44 or 46 to restrain relative axial motion between the inner and outer housings 14, 16. The removal of the end segments 50, 52 does not restrain relative rotation of the housings, but is believed to provide suitable axial support along the longitudinal axis of the inner housing to restrain relative axial motion of the housings. The use of axial end segments 50 and offset end segments 52 reduces the circumferential motion and rotation about axis 17 compared to when those axial segments 50, 52 are omitted. When omitted, the locking lugs may rotate without restraint between the adjacent ridges or within the circumferential recess between such ridges. The axial segments 50 and/or 52 limit such rotation about axis 17.

The ridges 42, 44, 46 extend for a majority of the length of the inner housing and preferably extend the entire length or substantially the entire length of the inner housing along the longitudinal axis. By substantially the entire length is meant about 90 percent or more of the specified length. The space between the adjacent ridges within each set of ridges 42, 44, 46 is preferably the same, with only the ends of each pair of ridges joined by axial end segments 50 and offset end segments 52 being staggered. The axial space between the adjacent ridges 42, 44, 46 is preferably larger than the axial length of the respective locking lugs 56 so the locking lugs and outer housing can rotate relative to the inner housing. The offset end segments 52 and latching protrusion 54 may be used to limit rotation and to retain the parts in the rotated position, respectively. Alternatively, a narrowing in the spacing between the adjacent ridges may be used to create a releasable interference fit with the locking lugs to retain the inner and outer housings in a desired relative rotation—once the axial length has been set.

Outer housing 16 is provided with rotational interlock devices such as housing threads 58, 60 on opposing upper and lower ends of the housing, respectively. Advantageous, internal threads 58 on the outer housing are on the upper end and external threads 60 are on the lower end. Advantageously, the upper threads 58 are located on the inside of an enlarged end 62 on the outer housing 16. The threads 58, 60 are mating threads so a second outer housing 16 can be threadingly connected to a first outer housing 16. The enlarged end 62 is formed by a larger diameter but short, cylindrical upper end of the outer housing 16, forming a short, outwardly extending shoulder at the bottom of the enlarged end. The threads 58, 60 are preferably double lead threads with one lead beginning on an opposing side of the housing 16 than the other lead. Rotational interlock devices other than threads can be used, including bayonet locks.

The depicted base 10 has an inner housing 14 with three channels 48 and the outer housing 16 has three columns of locking lugs 56 located and sized to move axially along those channels 48. Those channels are advantageously located so that one central channel is in the vertical plane of the flange 30 and the other two side channels are about 90° on each side of that central channel, with a plane through the side channels preferably being generally parallel to the plane of the housing support 24. Thus, relative to the longitudinal axis 17, first and second sets of ribs 42, 44 extend across a circumferential arc of close to but less than 90° while the third set of ribs 46 extend across a circumferential arc close to but less than 180°. The corresponding locking lugs 56 are also located in three columns, spaced 90° apart, so the locking lugs can coincide with the channels 48. This arrangement is believed to offer advantages in injection molding the bracket 10.

The outer surface of the outer housing 16 may have stiffening ribs extending outward therefrom. The depicted housing 16 circumferential stiffening ribs 61 and axial stiffening ribs 63 extending parallel to axis 17. The four circumferential stiffening ribs 61 are equally spaced along the length of axis 17, while the four axial stiffening ribs are rotationally spaced about axis 17 every 90 degrees, for a housing 16 that is about 2-3 inches diameter. The number of ribs may vary. The ribs 61, 63 also help entrain the housing in the concrete, with the circumferential ribs 61 resisting motion along axis 17 when entrained in concrete, while the axial ribs 63 resist rotation about axis 17 when entrained in concrete. Many other configurations of ribs may be used.

A cap 64 is configured to cover the top end of the outer housing 16 and to also cover the top end of the inner housing 14 and optionally has appropriate connections to releasably connect to the inner and outer housings 14, 16 and avoid unintended removal. But the cap 64 need not be configured to securely connect to the top end of the inner housing as it need only be capable of covering the top end of the inner housing. The preferred use of the cap 64 is to releasably and securely connect to the top of the outer housing 16. The cap 64 is preferably centered on longitudinal housing axis 17 during use. Rotational interlock devices such as a bayonet mount or cap threads 66 are advantageously provided on a skirt depending from the outer periphery of the cap 64 and are configured to engage the rotational interlock device such as mating threads 58 on the outer housing 16. Advantageously, when the bottom of the cap's skirt hits the shoulder formed by the enlarged end 62, the top surface of the cap is flush with the end of the outer housing 16 and positioned at or slightly below the surface of the finished concrete during use. External cap threads 66 are believed preferable to internal cap threads because the top end of the outer housing is embedded in concrete and the external threads place the threaded connection with the outer housing 16 inside the housing.

The cap 64 advantageously has flexible filaments 68 extending upward from the top surface of the cap 64, preferably centered on and extending along housing axis 17 during use. The filaments 68 flex during finishing of the concrete surface and stick up above the finished concrete surface to identify the location of the cap 64 and associated housings 14, 16 and the contents of the housings passing through the tube 21. The cap 64 advantageously has one or more wrenching recesses 70 on its exterior or upper surface, configured to receive tools that rotate the cap and break it free of any concrete entraining the cap. The shape of the recesses may vary. A plurality of ribs 72 may be provided on the outer periphery of the enlarged end 62 to make it easier to manually grip and rotate the outer housing 16, and to further lock the enlarged head in the concrete during use.

Figure 5A:
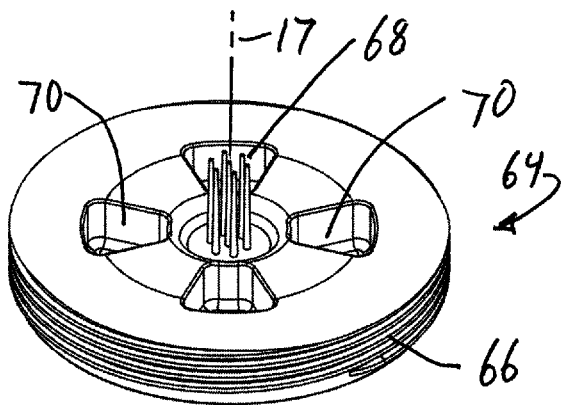
FIG. 5A is a top perspective view of the cap of FIG. 1.
Figure 5B:
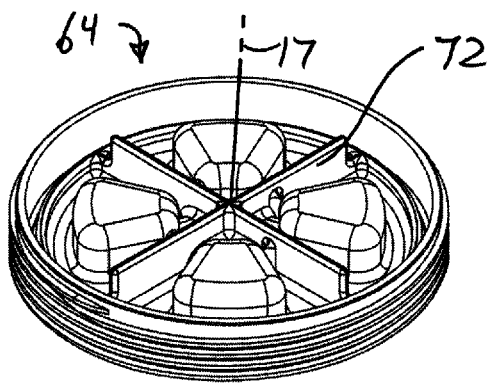
FIG. 5B is a bottom perspective view of the cap of FIG. 5A.
Figure 5C:
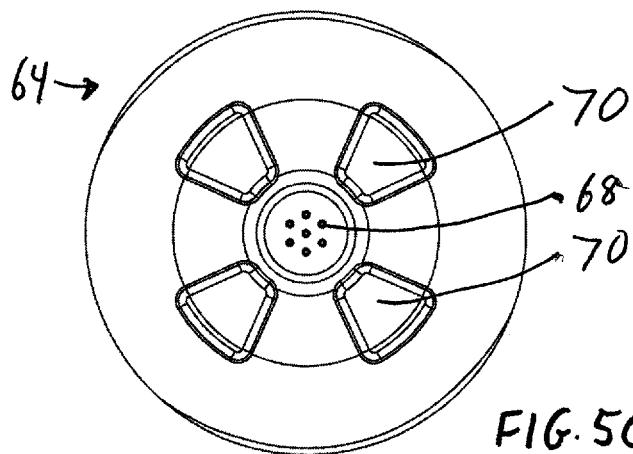
FIG. 5C is a top view of the cap of FIG. 5A.
Figure 5D:
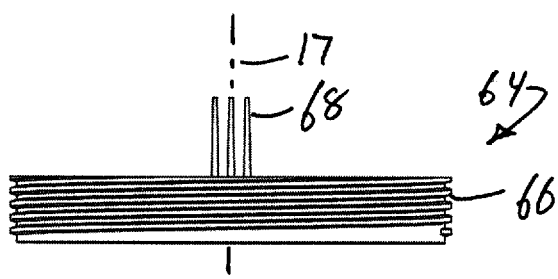
FIG. 5D is a front view of the cap of FIG. 5C, with the back view being the same.
Figure 7C:
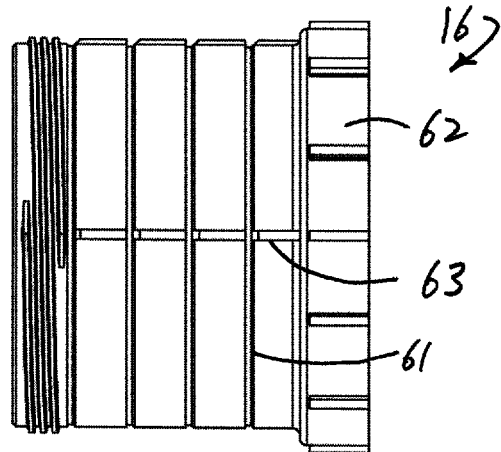
FIG. 7C is a left side view of the outer housing of FIG. 7B, with the right side view being the same.
Figure 7B:
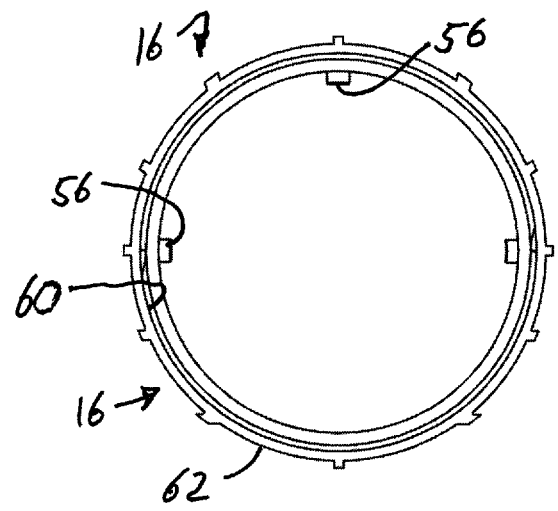
FIG. 7B is a top view of the outer housing of FIG. 7A.
Figure 7A:
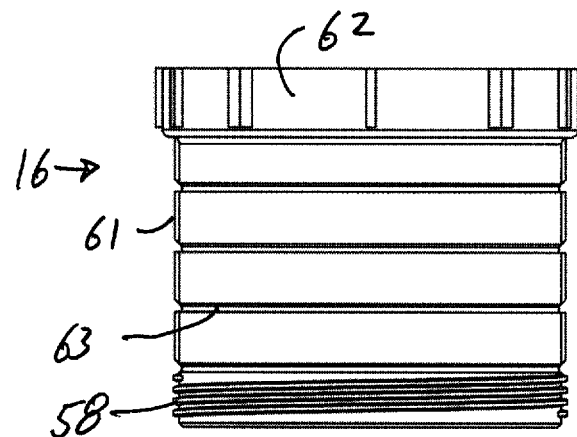
FIG. 7A is a front view of the outer housing of FIG. 6A.

As seen in FIG. 5B, the bottom side of the cap 64 has centering protrusions 72 in the form of two crossed bars forming an "X" shape, with the radially outward ends of the terminating before the depending skirt of the cap. The space between the centering protrusions 72 and the depending skirt of the cap receive the upper part of the inner housing 14 to restrain lateral movement of the cap relative to the inner housing, with the cap preventing concrete from entering the inner housing when the cap 64 is placed over the inner housing. Optionally, a circular locking flange (not labeled) may extend downward from the bottom side of the cap 64, with the locking flange located inward of the depending skirt on which cap threads 66 are formed. The locking flange may be configured to trap the top part of the inner housing 14 between the locking flange and the adjacent skirt of the cap 64, to more securely hold the cap to the inner housing. The locking flange is shown as continuous, but could be intermittent. As seen in FIGS. 1 and 5A, 5C, the wrenching recesses 70 do not interfere with the centering protrusions and locking flange as the radially outward end of the wrenching recesses terminate inward of the centering protrusions 72 and locking flange.

Referring to FIGS. 1 and 4A-4D, the base 22 has a rear flange 80 at the heel end of the base, with two rear feet 26 connected to the rear flange 80. The rear flange 80 is generally parallel with the toe end of the base 22, with the base having an arch 82 between the toe end and heel end of the base. The housing support 24 has a truncated triangular shape with the base of the triangle extending across the width of the base 22 at the rear flange 80, and the top of the truncated triangular shape ending at or shortly below the inner housing 14, with a short rectangular extension between the bottom of the inner housing and the truncated top end of the triangular shape as best seen in FIGS. 2B, 4B and 4C. Alternatively described, the base of the housing support 24 is shaped like an isosceles trapezoid with the non-parallel legs converging, and a rectangular portion 84 (FIG. 2B, 4B, 4C) extending from the top of the isosceles trapezoid.

The housing support 24 provides lateral support and stability to the inner housing 14 by connecting the bottom of the inner housing to the base 22 and provides further support in the plane of the bottom stiffening flange 31 by connecting to that stiffening flange and the curved support part 20*a* and the base 22. The rectangular top portion of the housing support allows the outer housing 16 to fit down over the inner housing 14 until the bottom of the cap 64 on the outer housing hits the top edge of the inner housing. It is believed suitable to have a rectangular housing support 24 extending downward from the bottom of the housing to the base 10, and having a width not greater than the width of the housing at the location of the housing support. But the width of the housing support 24 at the juncture with the bottom 15 of the inner housing 16 is relative small as its location is offset from the largest diameter of the inner housing. A larger support at the concrete form 12 is believed more desirable. Thus, the triangular shaped portion of the housing support 24 is believed stronger and more stable than a narrower, rectangular-shaped housing support as it provides for a more spread-apart support at the base 22 and the concrete form 12.

The housing support 24 is shown as connecting to the base 22 at the juncture of the rear flange 80 and the arch 82. As seen in FIGS. 1, 2A and 4A, the toe end of the base 22 curves with and is connected to the curved support part 20*a*, shortly before the recurve toward the rear flange 80 and its associated feet 26.

Figure 2A:
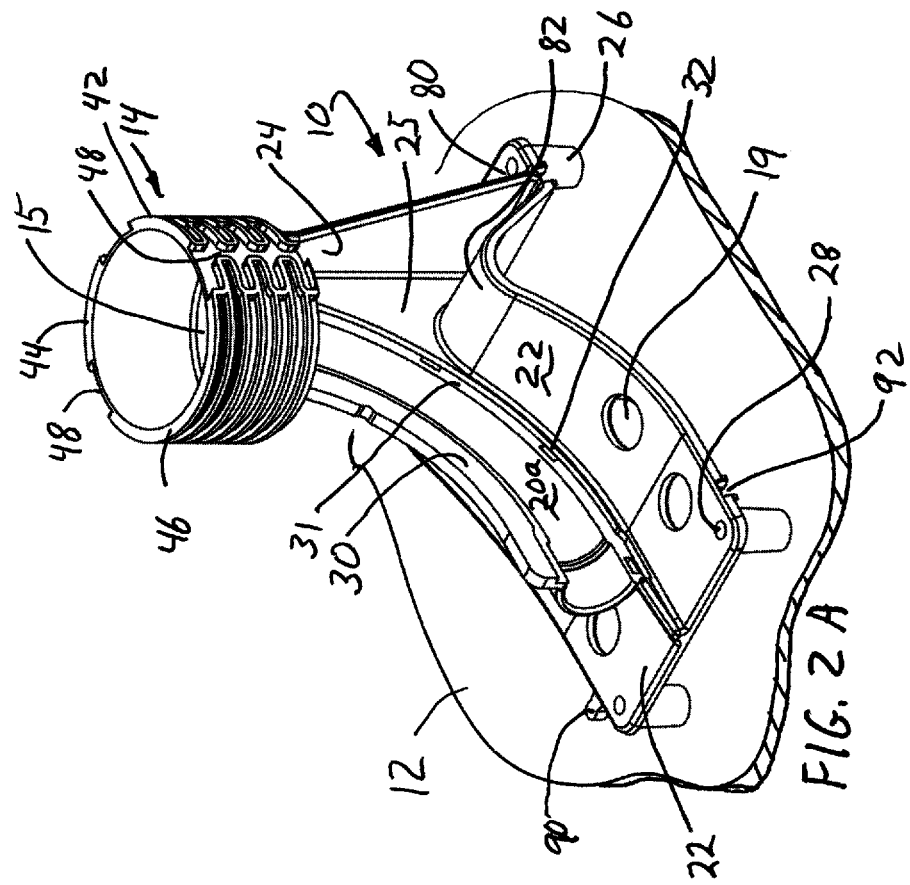
FIG. 2A is a top perspective view of an integrally molded bracket shown in FIG. 1.
Figure 2B:
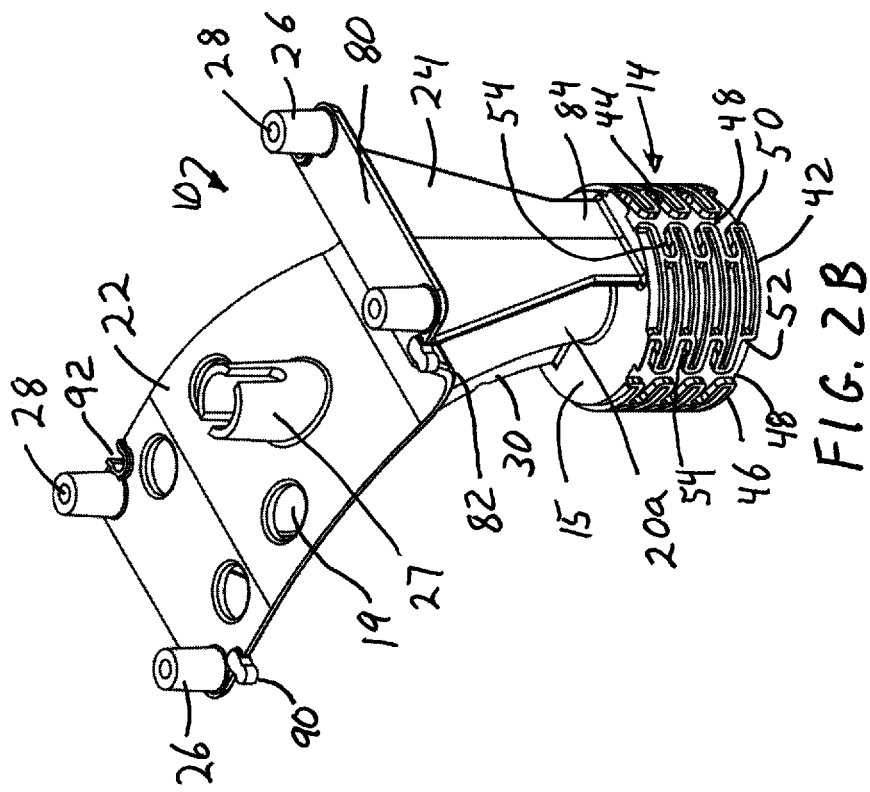
FIG. 2B is a bottom perspective view of the bracket of FIG. 2.

Referring to FIGS. 1, 2A and 4A, the bottom stiffening flange 31 may extend from the base 22 at the toe end of the base, in a generally vertical direction, and with upper stiffening flange 30 extending vertically from a top side of the first support part 20*a*, which preferably has a generally semi-circular cross-section when the tube 21 has a circular cross-section. The cross-sectional shape of the curved support 18 preferably conforms to the cross-sectional shape of the tube 21. The top end of the curved support part 20*a* and the top end of the top stiffening flange 30 are both advantageously connected to the inner housing 14, preferably connected to the bottom 15 of that inner housing. The base 22 is connected to the curved support part 20*a* until a location near the middle of the curved length of the curved support part 20*a*, at which the arch 82 begins to recurve downward to juncture of the housing support 24 and the rear flange 80.

In the depicted embodiment, the toe-end of the base 22 extends beyond the toe-end of the curved support 18, preferably by about an inch or so, but could be flush with the end of the curved support 18 or the curved support could extend beyond the toe end of the base 22.

The depicted embodiment is aesthetically configured to have a profile resembling a high-heeled shoe with a prominent plate following that profile and having a visible, upwardly extending arch between the toe end and heel end that extends upward a distance of about 2-3 inches from a plane through the toe end of the base 22 and the rear flange 80. The base 22 has a rectangular outer profile when viewed from the top or bottom. The depicted base 22 has a width of about 3-4 inches and a length of about 6-8 inches.

The toe end of the base 22 is close to the concrete form 12 and is generally parallel to the concrete form 12 at the toe end. The space between the base 12 and the concrete form 12 at the toe end is determined by the length of the feet 26 and central support 27 which preferably abut the concrete form 12 during use. A minimum offset of about 2-3 cm (about half an inch) is believed suitable. Longer lengths of the feet 26 and central support 27 allow deeper entrainment in the concrete but less lateral stability during construction before the concrete is poured. Openings 19 through the base 22 at the toe end allow free passage of air from beneath the toe-end of the plate and to allow concrete to more easily entrain the toe-end of the plate and to avoid air pockets which may result in voids in the concrete. Four circular openings 19 are shown in a square arrangement, but other shapes and arrangements and numbers of opening are believed suitable.

Except for the curved support part 20*b* and outer housing 16, the bracket 10 is preferably injection molded in a single pour of plastic to form a unitary, injection molded part or assembly that is injection molded in its entirety at one time. The only parts of bracket 10 not formed during this unitary, injection molding operation are the curved support part 20*b*, outer housing(s) 16 and cap 64, as those parts are physically separate, but may be later connected to complete the functional use and formation of the bracket 10.

As used herein, references to a unitary part refer to such an injection molded portion of bracket 10. This unitary, injection molded part or bracket 10 is different from separately made parts that are connected together by various means such as welding, melting, adhesives or threaded fasteners as such unitary, injection molded part is believed to be stronger (when comparable materials are used), less expensive to make and more consistent in material composition, shape, form, fit and strength.

The tube 21 is usually contained in a protective tube 86 for embedding in concrete. A protective tube made of corrugated material, or polypropylene, or flexible polyvinyl chloride (PVC) tube are believed suitable for use with bracket 10. While less desirable, a metal conduit is believed suitable for use with the bracket 10. The bracket 10 is believed especially suitable for use with tubes 21 of about 0.5 inches diameter, with protective tubes 86 of about 1.0 inches in diameter. But by adjusting the materials and/or dimensions, various diameters of tubes 21, 86 may be used for concrete slabs of different thickness.

The protective tubes 86 preferably have a connector end 88 with a latch 90 or catch 92 thereon. Typically, a male latch member 90 more commonly found on the connectors but it could be a female recess or catch 92. The entry end of the curved support 18 is advantageously enlarged and has the mating catch 92 or latch 90 thereon to provide a positive connection holding the connector and protective tube to one of the curved support parts 20*a* and thus the base 22 and bracket 10.

In use, the concrete form 10 is placed where concrete will be poured, typically on a horizontal surface but possibly on a vertical surface. Fasteners pass through passages 27 in the feet 26 to secure the bracket 10 to the concrete form 12. The tube 21 is inserted into the inner housing 14 from the lateral side of the bracket 10 that is open. A distal end of the tube 21 is inserted upward through the opening 19 in the bottom 15 of that inner housing 14. If the tube 21 is inserted downward through the opening 19, then the entire length of the tube must pass through the opening, or the tube must be spliced. The tube 21 is then placed into the open, curved length of the curved support part 20*a*. The curved support part 20*b* is then snapped onto the curved support part 20*a* to form the curved support 18 and to enclose the tube 21 in that curved support. A plurality of latches 34 having hooked ends pass through openings 34 shaped to allow passage of the laches and engage the hooked ends of the laches, form a latch and catch assembly. The first and second curved support parts 20*a*, 20*b* thus snap together to form a snap-fit connection holding the tube 21 in position in the curved support 18. Connecting the tube 21 to the curved support 18 and bracket 10 may be done before the bracket is fastened to the concrete form. It is easier to place the bracket 10 without the tube connected, but it is more difficult to accurately place the bracket on the concrete form 12 because of the length of the connected tube 21. Moreover, the curvature of the curved support 18 can help the curved support frictionally engage the tube 21 and resist the tube sliding down and out of the curved support, especially when the curved support is slightly larger in diameter than the outer diameter D of the tube 21. As used herein, slightly larger in diameter refers to a 15% or less difference in diameter. A radius of curvature of 3 to 6 inches over a 90° bend is believed suitable for a seven to ten-inch-thick concrete slab. Lager radii of curvature will be preferred for thicker slabs.

The height of the bracket 10 at the heel end of the bracket may be selected to be a minimum height just under a standard thickness of a concrete slab. If the slab thickness is the same or slightly higher than the height of the bracket 10 at the heel end, then the cap 64 is placed over the open, top end of the inner housing 16 and releasably connected to the inner housing by locking flange or by resting on the periphery of the inner housing 14. Concrete may then be poured to entrain the bracket 10 and tube 21.

If the height of the bracket 10 at the heel end of the bracket is sufficiently lower than the anticipated slab thickness, then the outer housing 16 is used to adjust the height as needed. The outer housing 16 is rotated about longitudinal housing axis 17 until its vertical columns of locking lugs 56 align with the respective longitudinal channels 48 on the outer surface of the inner housing 14. The outer housing 16 is moved downward along axis 17 until the desired height to the top of the outer housing is achieved, and then the outer housing is rotated about the housing's longitudinal axis so the locking lugs 56 move between adjacent ridges in the respective sets of ridges 42, 44 and 46—recognizing the number of rows of lugs 56, sets of ridges (42, 44, 46) and separating channels 48 will vary.

If the addition of one housing is insufficient to achieve the desired height, a second outer housing 16 can be connected to the first housing by engaging the external threads 58 of a second outer housing 16 with the internal threads 60 of the first outer housing 16. By using additional housings 16, the height of the housing can be adjusted in large increments, with the ridges and locking lugs allowing for small incremental adjustment of the height.

Advantageously, the locking lugs 56 are rotated about axis 17 to be placed between a pair of offset end segments 52 and hit a narrowing between the offset end segments to limit rotation about the outer housing's longitudinal axis. Advantageously, the locking lugs 56 engage various ones of the latching member 54 to releasably retain the engaged locking lugs. The latching protrusions 54 may form a sufficiently large narrowing of the space into which a locking lug 56 is inserted so as to form an interference fit that retains the locking lug. Advantageously though, the latching lug rotates past the latching member 54 so that removal requires rotating the outer housing 16 and the latching lugs past the latching protrusions 54, with the rotational resistance provided by the latching lugs being great enough to avoid accidental disengagement of the outer housing.

Once the height of the outer housing is set, the cap 64 is connected to the outer housing. The way the cap connects to the housing can vary. Advantageously, a rotational connection is used, such as cap threads 66 engaging mating housing threads 58 on the outer housing 16. In some situations, it may be desirable to set the height of the bracket and both housings 14, 26 before inserting the tube into the inner housing 14. The tube 21 may be inserted into a connected inner and outer housing 14, 16 before or after the bracket 10 is fastened to the concrete form. But adding the outer housing 16 can make the height of the housings 14, 16 large and that may impede the user's ability to reach toward the bottom 15 of the inner housing and pull the end of a tube 21 or wires in the tube, through the opening 19 in the bottom of the inner housing.

The desired height of the housing(s) 14, 16 include any height attributable to the cap 64. Once the height of the housings 14, 16 relative to the concrete support 12 are set and once the tube 21 is snapped into the curved support 18, the bracket 10 is ready for concrete. Construction workers preparing the building site may step on, bump, knock or kick the bracket and it is designed to maintain the height and orientation of the cap 64 parallel with the concrete form 12 and the finished concrete surface. Before pouring concrete, filaments 68 are connected to the cap 64 so they extend upward. When concrete is poured over and around the bracket 10 and housings 14, 16, the openings 19, the slotted central support 27, and the ridges 42, 44 and 46 help entrain the bracket in the concrete. When the concrete is being finished, the flexible filaments bend to allow finishing around the housings 14, 16 and cap 64, while identifying the location of the housings and cap. When the concrete is set, a worker locates the filaments, chips away any concrete covering the cap 64 and then removes the cap to allow access to the tube 21 and any elongated members passing through the tube 21 and into the housings 14, 16.

The tube 21 may comprise any rigid or flexible tubing suitable for its intended use. As used herein, flexible means the ability to be manually and repeatedly flexed numerous times through a substantial arc of 60 to 90 degrees without breaking, whereas a rigid tube is substantially capable of maintaining its substantially straight shape without external support when held horizontally from one end. The tube may be bendable so as to allow manually bending. Smurf tubing, or corrugated plastic conduit, is commonly used for the flexible tube 21.

Referring to FIGS. 8-11, two tubes 21 and two curved supports 18 may be used with one bracket 10. The previously described parts are almost all the same and are given the same numbers and the detailed description is not repeated. In this embodiment, the stiffening flange may comprise a planar flange having a bottom part 30 and a top flange part 31, rather than having a first curved support part 20a with its semi-circular sidewall forming part of the flange, and the flange 30 may thus extend as a vertical plate from the toe end to the heel end where it joins the heel support flange 25. A first curved support 18 is advantageously on one side of the stiffening flange 30, 31 and a second curved support 18 is on the other side of the stiffening flange 30, 31. The first curved support part 20a opens to one lateral side of the stiffening flange 30, 31 as previously described, and the second curved support part 20a opens to the opposing lateral side in the same manner as previously described. As best seen in FIG. 11C, the curved support parts 20a are on opposing sides of the stiffening flange 30, 31, opening to and facing opposing lateral directions so that when the second curved support parts are connected to the bracket 10 and flange(s) 30, 21 two support tubes 18 are formed, one on each opposing side of the central stiffening flange 30, 31. The two curved support parts 20a advantageously have a portion of their curved cross-sectional wall form a unitary, injection molded part with the stiffening flange 30.

The lower stiffening flange 31 has a first plurality of openings or catches at locations below each curved support part 20a while the upper stiffening flange 30 has a second plurality of openings or catches 32 above each curved support part 20a, with each first and second plurality of openings or catches being interleaved for connecting to the second curved support parts 20b.

Figure 8:
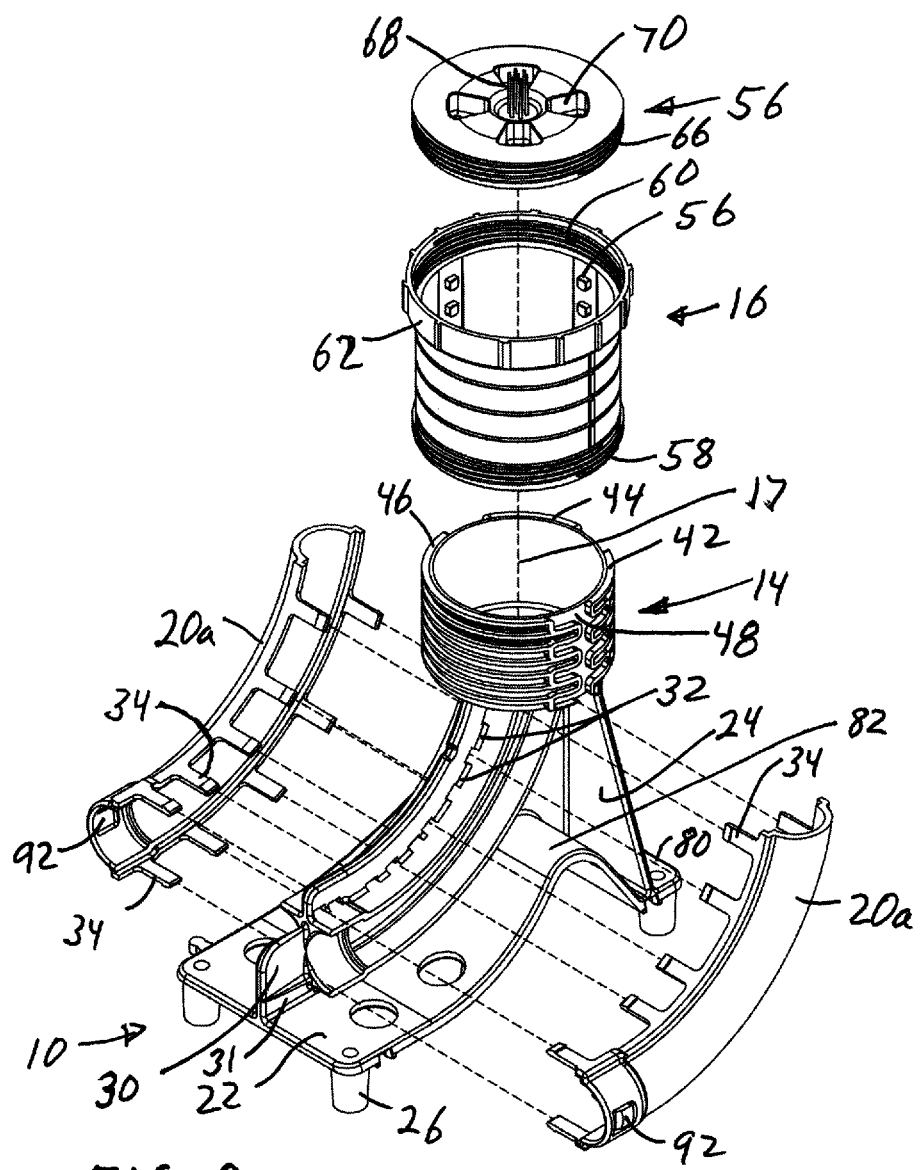
FIG. 8 is an exploded perspective view of a bracket assembly for two curved tubes held side-by-side, but without the tubes.

The latches 34 from the two support parts 20b mate with the openings or catches 32 in an interleaved or alternating manner as seen in FIGS. 8 and 12A. Because the flange 30 is a vertical plate in this configuration, curved support part 22a is not part of the flange 30 in this configuration, the flange 30 is offset to one side of each curved support 18 and the latches 34 have to extend further to reach the bottom stiffening flange 30 and top stiffening flange 31. Thus, the latches 34 appear longer in FIG. 8 than in FIG. 1.

The method may include concrete pouring and finishing steps. After the concrete slab 23 is poured the slab is finished, usually by a bull float step and later by troweling and likely power troweling steps. Advantageously the top surface of the housing and cap are flush with or slightly below the concrete surface so the whiskers 78 extend above the surface and flex with the various finishing steps to avoid cutting or detachment. The embedded cap, housing, base and connector are sufficiently strong to support a worker stepping on the bracket 10 and housing 14 during concrete finishing, and sufficiently strong to support the weight of the power trowel.

Figure 10:
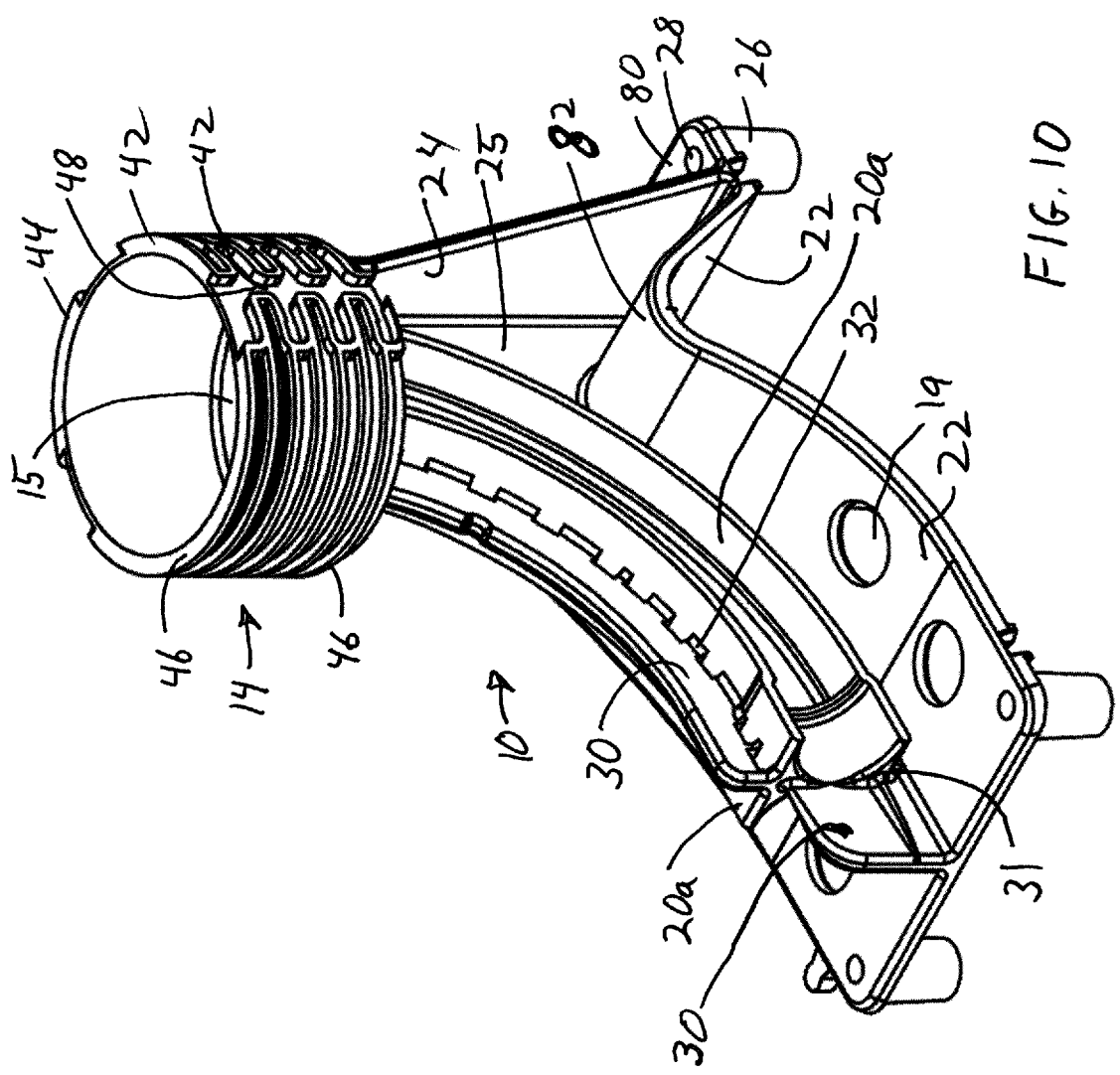
FIG. 10 is a top perspective view.
Figure 11B:
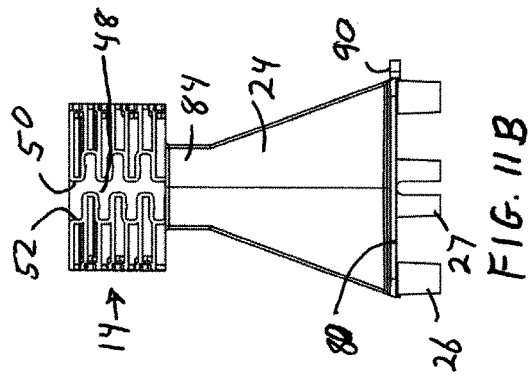
FIG. 11B is a right side view of the bracket of FIG. 11A.
Figure 11D:
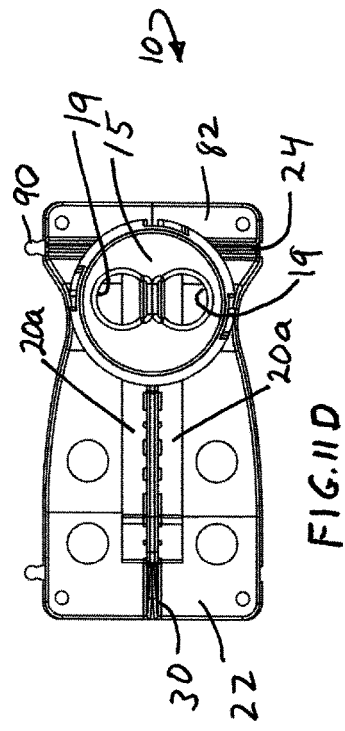
FIG. 11D is a top view of the bracket of FIG. 11A.
Figure 11A:
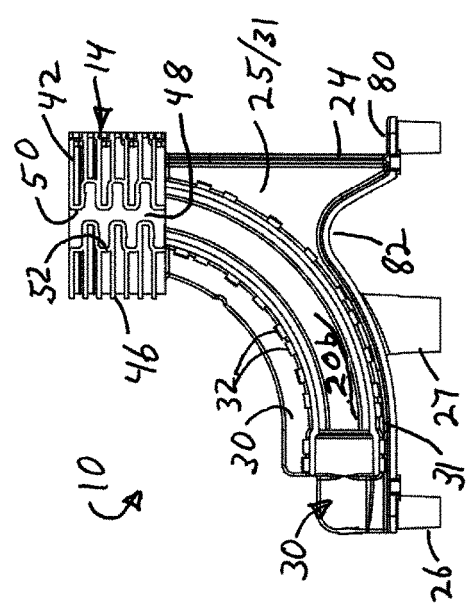
FIG. 11A is a side view of an integrally molded bracket shown in FIG. 8.
Figure 11E:
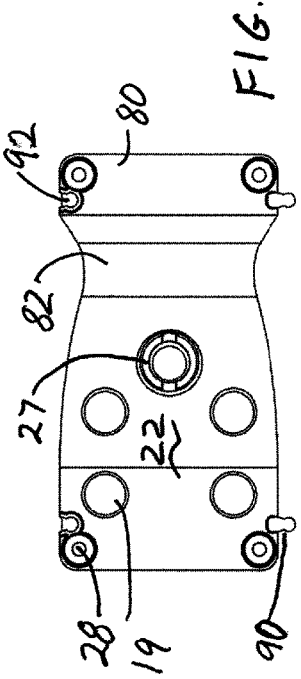
FIG. 11E is a bottom view of the bracket of FIG. 11A.
Figure 11C:
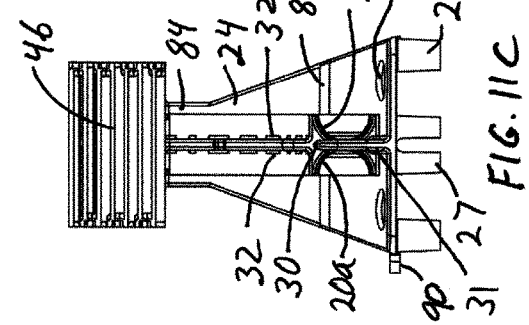
FIG. 11C is a left side view of the bracket of FIG. 11A.
Figure 13:
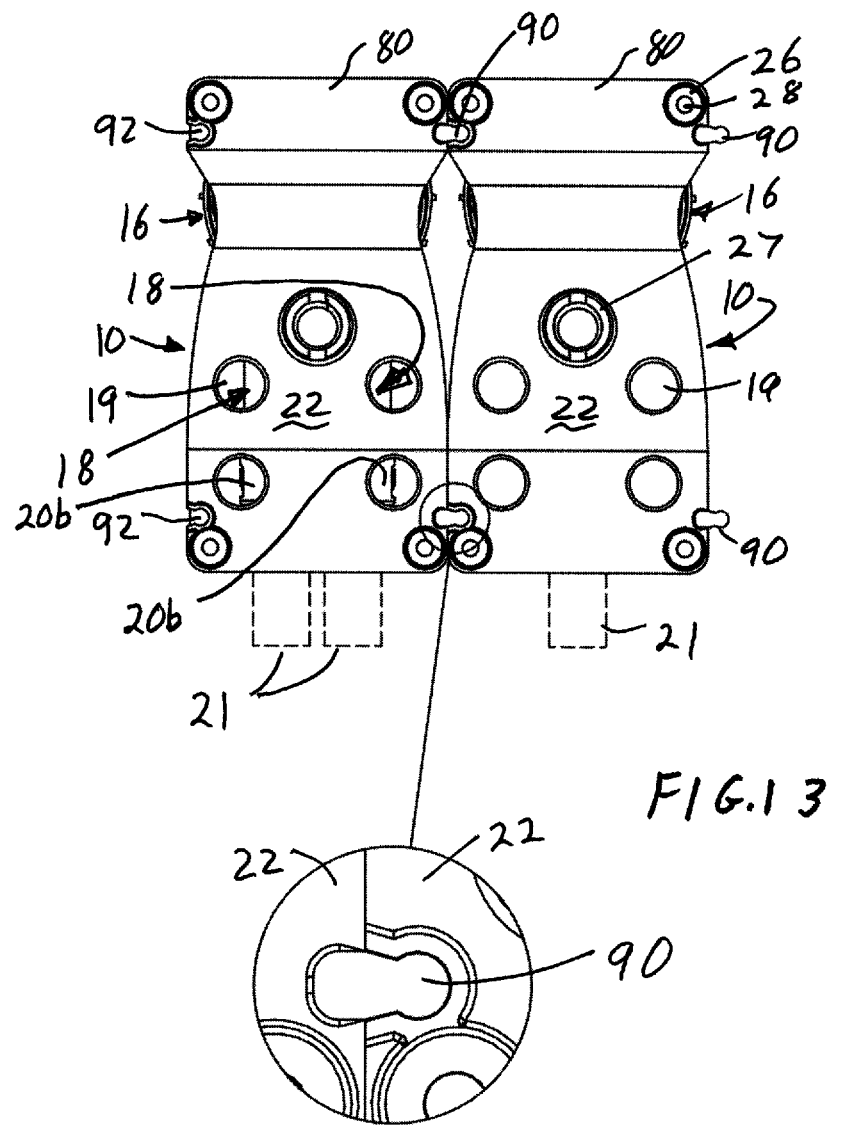
FIG. 13 is a bottom view of the two bracket assemblies of FIG. 12A with an enlarged view of a latch and catch holding the two bracket assemblies together.

Referring to FIGS. 8 and 10, the stiffening flange 30, 31 at the toe end of the base has a lateral thickness that increases from the end of the curved support parts 18 to the free end of stiffening flange 30, 31 and base 22. The width or thickness of the stiffening flange increases in the lateral direction to help spread apart the two connectors 88 and associated protective tubes 86 so that the protective tubes are more readily entrained in the concrete. Spreading the two protective tubes 86 apart helps vent air from below the protective tubes and enhances concrete entrainment. The toe-end of the flange 30, 31 thus extends beyond the toe-end of the curved supports 18 and increases in lateral dimension along an axis parallel to the base 22 and the concrete form 12. A short toe-end extension of about one inch in length with an increase in lateral dimension of about 0.1 inch at the toe-end of the curved support 18 to a lateral dimension of about 0.2 to 0.3 inches at the toe end of the flange 30, 31 is believed suitable for a protective tube 86 about one inch in diameter.

The method may include accessing the housing after the concrete hardens. When the concrete slab 23 is hardened, the whiskers identify the location of the housing and cap. Any thin layer of concrete covering the cap is removed, as needed. Tools, such as opposing jaws of channel grips or screwdrivers are placed into wrenching recesses 76 as needed to unscrew or otherwise remove the cap 72. The ends of the tube 32 and other tubes, wires, elongated members 33, etc. are then accessible for further use or connection. Advantageously, the inner housing 14 and outer housing 16 provide sufficient volume to contain enough undamaged tube and elongated members 33 (e.g., tubes, wires, cables) to allow a coupling (FIG. 1) or other connection with the tube or other elongated members 33 or other devices to be formed inside or near to the housing, after the concrete is poured.

Locking lugs 56 having a square shape about 0.2 to 0.3 inches on a side and extending about the same distance inward from the outer housing 16, are believed suitable for housings about 2-3 inches in diameter. A bracket 10 of unitary, injection molded polyethylene, polypropylene, PVC, or other injection moldable plastic is believed suitable. Housings 14, 16 about 2-3 inches in diameter and 2-3 inches high are believed suitable. The bracket 10 is believed especially suitable for use for concrete slabs with a thickness of at least 4 to 12 inches, preferably from 7 to 10 inches thick.

The concrete form 12 is described as a generally horizontal surface any typically comprises a sheet of plywood or a corrugated metal surface. But the concrete form 12 could comprise a surface formed by the ground, such as a leveled dirt surface, or the sides of a trench in the ground. If the bracket 10 is fastened to a vertical surface then the lateral direction will be generally up and down.

The various parts of the assembly may be provided in a kit form. Thus, the base 10 and its integrally molded parts may be provided with the second curved support part 20b and/or with one or more outer housings 16 and one cap 64. Likewise, the base 10 having two curved supports 18 may be provided in a kit form with two, second curved support parts 20b, two caps 64, and two outer housings 16, or multiples of two outer housings 16.

As discussed in the summary and in the operation of the bracket, there is also provided an improved method for forming the curved passage through a concrete slab.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination described herein.

What is claimed is:

1. A bracket for holding at least one tube having a cross-sectional diameter D while being embedded in a concrete slab having a planned thickness T, comprising:
   a base having a toe end and a heel end with a plurality of feet extending downward from the base and ending in a same horizontal plane;
   an inner cylindrical housing extending along a longitudinal housing axis, the inner housing located above and connected to the heel end of the base by a housing support, the inner housing having an open top and a generally closed bottom with at least one opening in the bottom to receive the at least one tube during use, the inner housing having at least a first, second and third plurality of equally spaced, circumferential recesses on an outer surface of the inner housing, the inner housing having three axial channels two of which are spaced 90°, each of the axial channels in communication with two of the three circumferential recesses, each axial channel being parallel to the housing axis;
   a tubular, outer housing having open top and bottom ends and extending along the housing axis and having a larger diameter than the inner housing to fit over the inner housing, the outer housing having a plurality of locking lugs extending inward with the locking lugs located in columns to move axially along respective ones of the axial channels separating the circumferential recesses, the locking lugs spaced axially to respectively align with the circumferential recesses and sized to fit into the circumferential recesses when the outer housing is rotated relative to the inner housing to interlock the locking lugs with the circumferential recesses and adjust the relative positions of the inner and outer housings along the longitudinal housing axis; and a first curved support having a first curved central axis with a first curved support part extending along that first curved central axis and having a first end connected to the toe end of the base and a second end connected to the inner housing at the bottom of the inner housing, the first curved support part configured to receive one side of a length of the at least one tube during use.

2. The bracket of claim 1, further comprising a cap configured to releasably connect to a top end of the outer housing.

3. The bracket of claim 1, wherein the first curved support includes a second curved support part extending along the first central axis and having a cross-section in a plane orthogonal to the first central axis and connected to the first curved support part to form a tubular passage in the first curved support having a cross-section larger than D to receive the at least one tube during use.

4. The bracket of claim 3, wherein one of the first and second curved support parts has latches and the other of the first and second curved support parts has catches to connect the first and second curved support parts together.

5. The bracket of claim 1, wherein the first curved support includes a second curved support part extending along that first central axis and having a cross-section in a plane orthogonal to the first central axis and connected to the first curved support part to form a tubular passage with a cross-section larger than D to receive the at least one tube during use.

6. The bracket of claim 3, wherein the first curved support part further comprises a top stiffening flange extending upward along a top side of the first curved support part and extending from a toe end of the first curved support part to the housing and connecting to the bottom of the housing, the top stiffening flange having one of a first plurality of catches or a first plurality of latches and the second curved support part having the other of the first plurality of catches or the first plurality of latches to interlock the top stiffening flange and the second curved support part.

7. The bracket of claim 6, wherein the first curved support part further comprises a bottom stiffening flange extending downward along a bottom side of the first curved support part and extends from the toe end of the first curved support part to the housing support, the bottom stiffening flange having one of a second plurality of catches or a second plurality of latches and the second curved support part having the other of the second plurality of catches or the second plurality of latches located to interlock the stiffening flange and the second curved support part.

8. The bracket of claim 1, wherein the base has a generally rectangular shape when viewed from a bottom of the bracket, with a foot at each corner of the base, the base having an opening on each opposing side of the first curved support part and at the toe end of the base to allow entrainment by concrete during use, and wherein a bottom portion of the housing support comprises a triangular shaped plate.

9. The bracket of claim 5, further comprising a central support extending from a middle of the base downward and ending in the same plane as the feet.

10. The bracket of claim 1, further comprising:
a stiffening flange extending upward from the base and extending from the toe end to the heel end of the base and connecting to the bottom of the housing and the housing support, the first curved support being located on a first side of the stiffening flange;

a second curved support located on a second side of the stiffening flange and having a second central axis and a third curved support part extending along that second central axis, the third curved support part having a first end connected to the base at the toe end of the base and having a second end connected to the bottom of the inner housing and in communication with an inside of the inner housing, the third curved support part having a cross-section in a plane orthogonal to the second central axis forming a portion of a tubular passage during use having a diameter larger than D.

11. The bracket of claim 10, wherein the second curved support includes a fourth curved support part extending along the second central axis and having a semi-circular cross-section in a plane orthogonal to the second central axis and connected to the second curved support to form the tubular passage with a cross-section having a diameter larger than D.

12. The bracket of claim 3, wherein a toe end of the second curved support part has one of a latch or catch to releasably connect to the other of a catch or a latch on a connector of a protective tube enclosing the tube having a diameter D during use of the bracket.

13. The bracket of claim 1, further comprising:
a second tubular, outer housing having open end and extending along the housing axis and having a larger diameter than the inner housing, each first and second outer housing having a plurality of locking lugs extending inward with the locking lugs located in columns to move axially along the channels separating the circumferential recesses, the locking lugs spaced axially to align with the circumferential recesses and sized to fit into the circumferential recesses when either the first or second outer housing is rotated relative to the inner housing to interlock the mating projections with the circumferential recesses and adjust the relative positions of the inner and outer housings along the longitudinal housing axis, each first and second outer housing having top and bottom rotational interlocking devices on respective top and bottom ends of each housing and configured so the first interlocking device of the second housing may interlock with the second interlocking device of the first housing to interconnect the first and second housings along the longitudinal axis, with a cap releasably engaging the top interlocking device of the second housing, and the locking lugs of the first housing engaging the circumferential recesses on the outer surface of the inner housing.

14. The bracket of claim 1, wherein the base comprises a rear flange located on an opposing side of the housing support as the first curved support, the rear flange having two feet, each on an opposing side of the rear flange.

15. The bracket of claim 1, wherein the cross-section is circular and has a diameter greater than D.

16. A kit to form a bracket for holding at least one tube having a cross-sectional diameter D while being embedded in a concrete slab, comprising:
a base having a toe end and a heel end with a plurality of feet extending downward from the base and ending in a same horizontal plane, each foot having a passage therethrough for a fastener;

an inner cylindrical housing extending along a longitudinal housing axis, the inner housing located above and connected to the heel end of the base by a housing support, the inner housing having an open top and a generally closed bottom with at least one opening in the bottom to receive the at least one tube during use, the inner housing having at least a first, second, and third plurality of equally spaced, circumferential recesses on an outer surface of the inner housing, the inner housing having three axial channels two of which are spaced 90°, each of the axial channels in communication with two of the three circumferential recesses, each axial channel being parallel to the housing axis;

a first curved support having a first central axis with first and second curved support parts each extending along the first curved central axis, the first curved support party having a first end connected to the toe end of the base and a second end connected to the inner housing at the bottom of the inner housing, the first and second curved support parts forming a tubular passage with a cross-section in a plane orthogonal to the first central axis larger than D;

a first, tubular, outer housing having opposing and open, top and bottom ends, the first outer housing having a larger diameter than the inner housing so it fits over the inner housing along the longitudinal axis, the first outer housing having a plurality of locking lugs extending inward and located in columns to move axially along the channels separating the circumferential recesses when the first outer housing moves along the housing axis and over the inner housing, the locking lugs spaced axially to align with the circumferential recesses and sized to fit into the circumferential recesses when the first outer housing and the inner housing are rotated relative to each other to interlock the mating projections with the circumferential recesses; and a removable cap for the top end of the outer housing.

17. The kit of claim 16, further comprising a second, tubular outer housing having open, top and bottom ends, the second outer housing having a larger diameter than the inner housing and fitting over the inner housing along the longitudinal axis, the second outer housing having a plurality of locking lugs extending inward and located in columns to move axially along the channels separating the circumferential recesses, the locking lugs spaced axially to align with the circumferential recesses and sized to fit into the circumferential recesses, the second outer housing having third and fourth rotational interlocking devices on the respective top and bottom ends of the second outer housing, and configured to interlock with a different one of the first and second interlocking devices of the first outer housing to interconnect the first and second outer housings along the longitudinal axis during use.

18. The kit of claim 16, wherein the first outer housing has top and bottom rotational interlocking devices on respective top and bottom ends of the first outer housing with the top rotational interlocking device on the first outer housing configured to releasably connect to the cap.

19. The kit of claim 16, further including a stiffening flange extending from the toe end to the heel end of the base and connected to the housing support and the bottom of the housing.

20. The kit of claim 19, wherein the stiffening flange has a first plurality of openings above the first curved support part and a second plurality of openings below the first curved support part, the first and second plurality of openings forming catches for latches extending from the second curved support part.

21. The kit of claim 20, wherein the first curved support part forms a portion of the stiffening flange.

22. The kit of claim 20, wherein the stiffening flange has opposing first and second laterally facing sides with the first curved support part located on the first laterally facing side, and further comprising:

a second curved support located on the second laterally facing side of the stiffening flange and having a second central axis, the second curved support having third and fourth curved support parts each extending along the second central axis, the third curved support part having a first end connected to the base at the toe end of the base and having a second end connected to the bottom of the inner housing and in communication with an inside of the inner housing, the third and fourth curved support parts forming a tubular passage with a cross-section in a plane orthogonal to the first central axis larger than D.

23. A method of supporting a tube during the forming of a concrete slab poured on a concrete form, using a bracket having a base and a housing with a cap enclosing a top opening of the housing to allow access to the tube when the tube is inside the housing, the tube extending along a curved axis between the concrete form and the planned surface, the method comprising the steps of:

securing the tube to the bracket which bracket has a curved, tubular support extending along the curved axis, the curved tubular support being separated along a vertical plane containing or parallel to the curved axis to form first and second curved support parts with the first curved support part being permanently affixed to the bracket, the securing step including placing the tube into the first curved support part and passing an end of the support tube through an opening in the bottom of the housing which comprises an inner housing that is permanently affixed to the first curved support part, the securing step further including connecting the second curved support part to the bracket to form the first support tube and enclose the tube along the curved axis;

passing a tubular outer housing having open ends and a larger diameter than the inner housing along the housing axis until an axial column of axially spaced locking lugs that extend inward from the outer housing align with at least a first, second and third plurality of equally spaced, circumferential recesses that each encircle a portion of an outer circumference of surface of the inner housing to adjust the relative height of the inner and outer housings along the housing axis, the inner housing having three axial cannels two of which are spaced 90°, each of the axial channels in communication with two of the three circumferential recesses; and fastening the bracket to the concrete form.

24. The method of claim 23, step of rotating one or both of the inner and outer housings and moving at least some of the locking lugs into the circumferential recesses.

25. The method of claim 24, wherein the rotating step occurs before the fastening step.

26. The method of claim 24, wherein the securing step occurs after the fastening step.

27. The method of claim 24, wherein the step of connecting the second curved support part to the bracket comprises engaging a plurality of latches on opposing top and bottom sides of the second curved support part with catches on opposing top and bottom sides of the first curved support part.

\* \* \* \* \*